(12) United States Patent
Inomoto et al.

(10) Patent No.: US 7,885,014 B2
(45) Date of Patent: Feb. 8, 2011

(54) ZOOM LENS SYSTEM AND IMAGE PICKUP APPARATUS INCLUDING THE SAME

(75) Inventors: Yu Inomoto, Tokyo (JP); Shinichiro Yakita, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 12/726,103

(22) Filed: Mar. 17, 2010

(65) Prior Publication Data

US 2010/0238566 A1    Sep. 23, 2010

(30) Foreign Application Priority Data

Mar. 18, 2009  (JP) .............................. 2009-066507

(51) Int. Cl.
*G02B 15/14* (2006.01)
(52) U.S. Cl. ...................... 359/688; 359/683
(58) Field of Classification Search ................ 359/676, 359/683, 688
See application file for complete search history.

(56) References Cited

U.S. PATENT DOCUMENTS

| | | | | |
|---|---|---|---|---|
| 5,831,771 | A * | 11/1998 | Suzuki | 359/689 |
| 6,002,528 | A * | 12/1999 | Tomita | 359/684 |
| 6,124,982 | A * | 9/2000 | Usui | 359/686 |
| 6,166,863 | A | 12/2000 | Ohtake | |
| 6,989,942 | B1 * | 1/2006 | Nurishi | 359/687 |
| 7,057,827 | B2 * | 6/2006 | Wakazono | 359/684 |

FOREIGN PATENT DOCUMENTS

| | | |
|---|---|---|
| EP | 1 659 422 A1 | 5/2006 |
| EP | 1 933 185 A1 | 6/2008 |
| JP | 8-146294 A | 6/1996 |
| JP | 2003-287678 A | 10/2003 |

OTHER PUBLICATIONS

Extended European Search Report issued in European Patent Application No. 10154229.8 dated Jun. 14, 2010.

* cited by examiner

*Primary Examiner*—Scott J Sugarman
(74) *Attorney, Agent, or Firm*—Rossi, Kimms & McDowell LLP

(57) ABSTRACT

A zoom lens system including, in order from an object side to an image side: a first lens unit having a positive refractive power; a second lens unit having a negative refractive power; a third lens unit having a negative refractive power; an aperture stop; and a fourth lens unit having a positive refractive power and including a front lens subunit and a rear lens subunit in which Abbe numbers of lenses in the rear lens subunit satisfy the following expression, $$0.400 < vm/(vrp-vrn) < 0.630,$$

where vm represents the Abbe number of the material of a first positive lens having the largest dispersion of the positive lenses included in the rear lens subunit, vrp represents the average Abbe number of materials of positive lenses other than the first positive lens in the rear lens subunit, and vrn represents the average Abbe number of materials of negative lenses in the rear lens subunit.

7 Claims, 14 Drawing Sheets

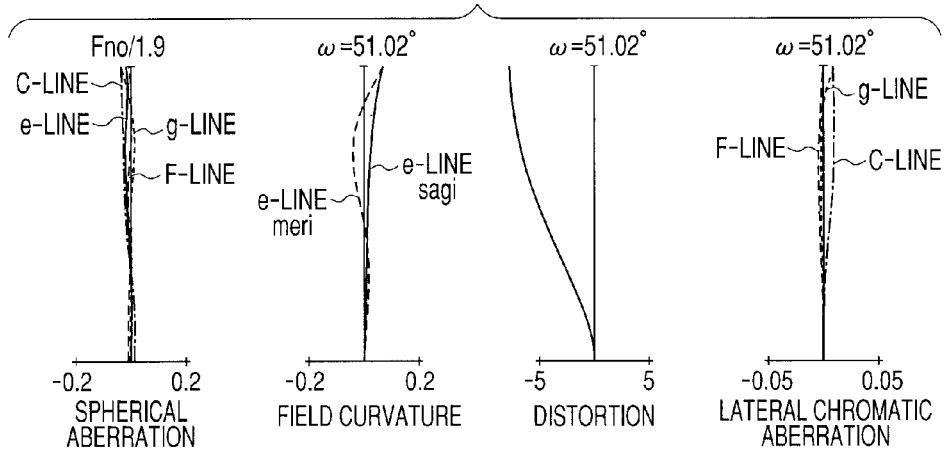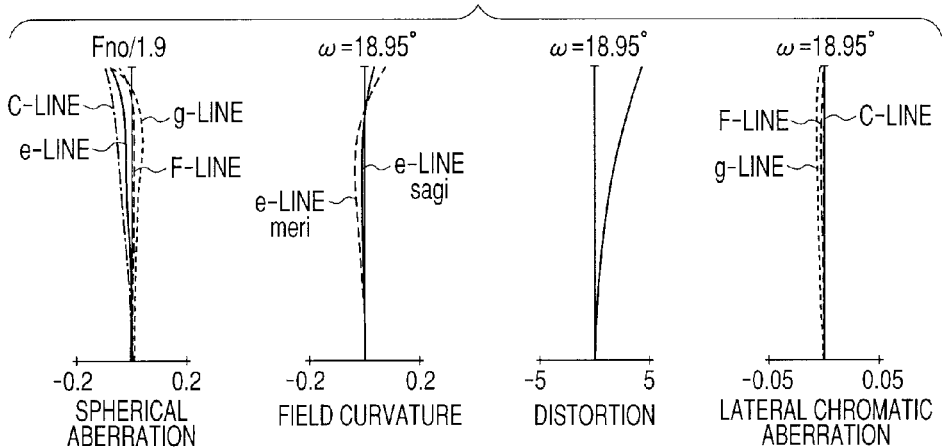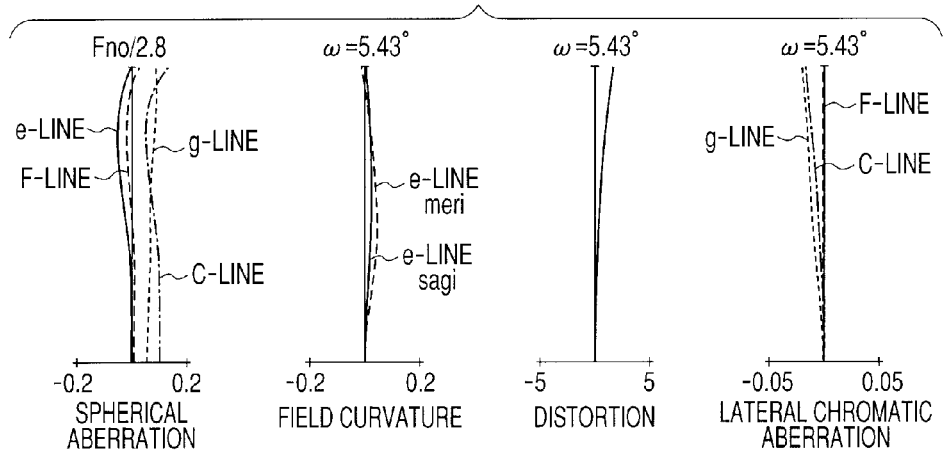

ZOOM LENS SYSTEM AND IMAGE PICKUP APPARATUS INCLUDING THE SAME

BACKGROUND OF THE INVENTION

1. Field of the Invention

The present invention relates to a zoom lens system and an image pickup apparatus including the same.

2. Description of the Related Art

In recent years, there has been a demand for a zoom lens system having both a high zoom ratio and a high optical performance for image pickup apparatuses such as television cameras, digital cameras and video cameras.

Positive lead type four-unit zoom lens systems in which four lens units are provided in total with the one of the lens units located closest to the object side having a positive refractive power have been known as zoom lens systems having a high zoom ratio (Japanese Patent Application Laid-Open No. 2003-287678 and Japanese Patent Application Laid-Open No. H08-146294). In such four-unit zoom lens systems, an optical material which has extraordinary dispersion or a diffraction element is used to correct for chromatic aberration.

However, along with a higher zoom ratio of the zoom lens system and a higher definition of an image pickup element, higher performance of the zoom lens system, in particular, further reduction in axial chromatic aberration over the entire zoom range is demanded.

SUMMARY OF THE INVENTION

A zoom lens system according to the present invention includes, in order from the object side to the image side; a first lens unit having a positive refractive power, a second lens unit having a negative refractive power, a third lens unit having a negative refractive power, an aperture stop, and a fourth lens unit having a positive refractive power, in which; the fourth lens unit includes, in order from the object side, a front lens subunit having a positive refractive power and a rear lens subunit having a positive refractive power with a largest air interval in the fourth lens unit therebetween, wherein the following expression is satisfied, $$0.400 < vm/(vrp-vrn) < 0.630,$$

where $vm$ represents an Abbe number of the material of a first positive lens having the largest dispersion of the positive lenses included in the rear lens subunit, $vrp$ represents the average Abbe number of the materials of the positive lenses other than the first positive lens in the rear lens subunit, and $vrn$ represents the average Abbe number of the materials of the negative lenses in the rear lens subunit.

Further features of the present invention will become apparent from the following description of embodiments with reference to the attached drawings.

BRIEF DESCRIPTION OF THE DRAWINGS

FIG. 2A is a longitudinal aberration graph in Numerical Embodiment 1 of the present invention when an object distance is 2 m at the wide-angle end.

FIG. 2B is a longitudinal aberration graph in Numerical Embodiment 1 when the object distance is 2 m at a focal length of 16.02 mm.

FIG. 2C is a longitudinal aberration graph in Numerical Embodiment 1 when the object distance is 2 m at a telephoto end.

DESCRIPTION OF THE EMBODIMENTS

Figure 1:
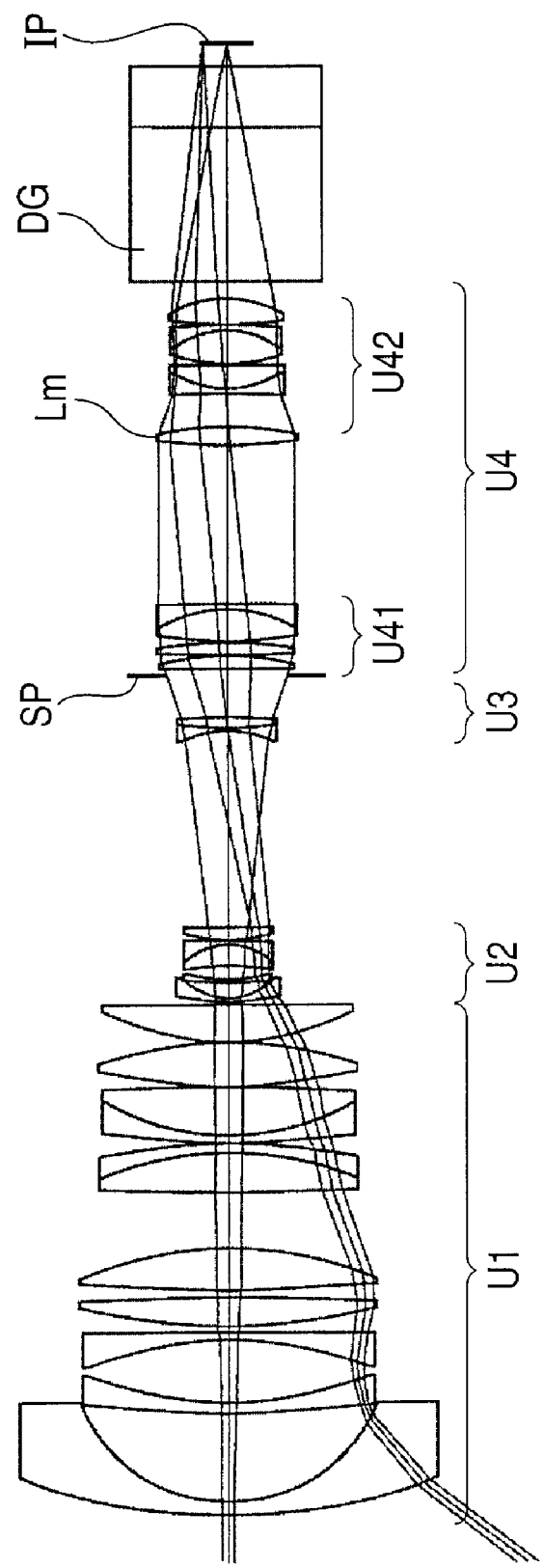
FIG. 1 is an optical path diagram illustrating a zoom lens system according to Embodiment 1 of the present invention in a state of focusing on an infinite-distance object at a wide-angle end.

An advantage of the zoom lens system of embodiments of the present invention is the provision of a zoom lens system which has a high zoom ratio and can reduce lateral chromatic aberration appropriately over the entire zoom range.

Therefore, the zoom lens system of the embodiments includes, in order from the object side to the image side, a first lens unit U1 having a positive refractive power, a second lens unit U2 having a negative refractive power, a third lens unit U3 having a negative refractive power, an aperture stop SP, and a fourth lens unit U4 having a positive refractive power. Here, the first lens unit moves in the optical axis direction at least in part (or maybe as a whole) along with the focusing operation. The second lens unit moves along with magnification-varying (zooming) in the optical axis direction (moves toward the image side along with the magnification-varying from the wide-angle end to the telephoto end). The third lens unit moves in the optical axis direction so as to compensate for image plane variation (movement in the optical axis direction) due to the movement of the second lens unit. The fourth lens unit does not move for the magnification-varying (zooming), but may move along with the focusing operation (the fourth lens unit does not move also in the focusing operation in the embodiments). The fourth lens unit includes, in order from the object side, a front lens subunit having a positive refractive power and a rear lens subunit having a positive refractive power with a largest air interval in the fourth lens unit therebetween.

The zoom lens system of the present invention is characterized in that the following condition is satisfied in the above-mentioned structure.

$$0.400 < vm/(vrp - vrn) < 0.630 \quad (1)$$

where vm denotes an Abbe number of the material of a positive lens (first positive lens) Lm having a largest dispersion among positive lenses included in the rear lens subunit, vrp denotes the average Abbe number of materials of positive lenses other than the first positive lens (other than the positive lens Lm) included in the rear lens subunit, and vrn denotes the average Abbe number of materials of negative lenses included in the rear lens subunit.

Here, an Abbe number vd of the material of an optical element (lens) used in the embodiments with respect to the d-line is defined as follows, $$vd = (Nd - 1)/(NF - NC) \quad (2)$$

where NF, Nd and NC denote refractive indices of the optical element with respect to the F-line (486.1 nm), the d-line (587.6 nm), and the C-line (656.3 nm) of the Fraunhofer lines, respectively.

If the conditional expression (1) is satisfied, the lateral chromatic aberration of the zoom lens system having high magnification-varying can appropriately be reduced over the entire zoom range (the entire zoom range from the wide-angle end to the telephoto end).

Here, it is more preferred to satisfy the following conditional expression.

$$0.540 < vm/(vrp - vrn) < 0.629 \quad (1a)$$

Conditional expressions (9)-(20) described below are the conditional expressions in which desirable conditions are set for solving additional problems in the zoom lens system of the present invention. A more specific description is as follows.

In order to obtain high optical performance in such a four-unit zoom lens system as described above, it is important in particular to correct lateral chromatic aberration at the wide-angle end and axial chromatic aberration at the telephoto end. When correcting both the lateral chromatic aberration at the wide-angle end and the axial chromatic aberration at the telephoto end appropriately, the number of lenses may increase or an effective diameter of the lens system may increase unless an appropriate arrangement of materials is determined.

An axial chromatic aberration coefficient L and a lateral chromatic aberration coefficient T of the lens system are expressed as follows, $$L = \Sigma(h\_i \times h\_i \times \phi\_i / v\_i) \quad (3),$$

$$T = \Sigma(h\_i \times h\_\mathrm{bar}\_i \times \phi\_i / v\_i) \quad (4),$$

where h_i denotes a height from the optical axis of the on-axial ray in the i-th lens (thin lens) in the paraxial tracing, h_bar_i denotes a height from the optical axis of the off-axial principal ray in the i-th lens in the paraxial tracing, $\phi\_i$ denotes a refractive power of the i-th lens in the paraxial tracing, and v_i denotes an Abbe number of the i-th lens in the paraxial tracing.

It is understood from these expressions that the axial chromatic aberration is proportional to the square of the height h, and that the lateral chromatic aberration is proportional to the height h and the height h_bar.

With the above-mentioned structure of the fourth lens unit U4, performances for correcting the axial chromatic aberration and the lateral chromatic aberration can be shared appropriately by the individual subunits in the fourth lens unit. In other words, a large contribution for correcting the lateral chromatic aberration can be assigned to the rear lens subunit. Therefore, in the zoom lens system of each embodiment, the positive lens (first positive lens) Lm is disposed in the rear lens subunit that is closest to the image plane, and hence the lateral chromatic aberration (in particular, the lateral chromatic aberration at the wide-angle end) can be reduced appropriately.

In each embodiment, the aperture stop SP is disposed in the object side of and in the vicinity of the front lens subunit U41 (the aperture stop SP is disposed at a position closer to the fourth lens unit than the third lens unit). In this case, h_bar in the rear lens subunit U42 is relatively larger than h_bar in the front lens subunit U41. In addition, an air interval having an appropriate length is provided between the front lens subunit U41 having a positive refractive power and the rear lens subunit U42 having a positive refractive power, and hence h_bar in the rear lens subunit U42 can be increased.

In view of the above, it is necessary to select optical material for the positive lens Lm appropriately so that the lateral chromatic aberration is effectively corrected. Hereinafter, an achromatic condition for a lens unit which includes a positive lens and a negative lens and has a positive refractive power $\phi$ as a whole is described. In this case, the refractive power $\phi(>0)$ of the entire lens system is expressed as follows.

$$\phi = \phi 1 + \phi 2 \quad (5)$$

where $\phi1$ denotes a refractive power of the positive lens, $\phi2$ denotes a refractive power of the negative lens, and $\phi1>0$ and $\phi2<0$ are satisfied.

In addition, when $\nu1$ denotes an Abbe number of the positive lens and $\nu2$ denotes an Abbe number of the negative lens, the chromatic aberration in the lens unit can be decreased appropriately as E expressed by the expression below approaches zero.

$$E=\phi1/\nu1+\phi2/\nu2 \quad (6)$$

where, if E=0 is satisfied, the imaging position becomes the same between the F-line and the C-line, and hence the primary achromatic characteristic can be achieved.

Here, $\phi>0$ is satisfied in the conditional expression (5). Therefore, $|\phi1|>|\phi2|$ is satisfied. In order to satisfy E=0 under this condition, it is necessary that the Abbe numbers of the positive and negative lenses satisfy $\nu1>\nu2$ from the conditional expression (6). In other words, it is necessary to configure the lens unit (to select optical materials of the lenses) so that the Abbe number of the positive lens is larger than that of the negative lens.

When the primary achromatic characteristic is achieved between the F-line and the C-line in this way, the imaging position of the g-line is shifted from the imaging position of the F-line and the C-line. A deviation amount (secondary spectrum) $\Delta$ of the above-mentioned imaging position is expressed by the expression below, $$\Delta=-(1/\phi)(\theta1-\theta2)/(\nu1-\nu2) \quad (7),$$

where $\theta1$ and $\theta2$ denote partial dispersion ratios of the positive and negative lenses, respectively. Here, the partial dispersion ratio $\theta gF$ with respect to the g-line and the F-line is defined as follows, $$\theta gF=(Ng-NF)/(NF-NC) \quad (8),$$

where Ng, NF, Nd, and NC denote refractive indexes of the optical material with respect to the g-line (435.8 nm), F-line (486.1 nm), d-line (587.6 nm), and C-line (656.3 nm) of the Fraunhofer lines, respectively.

Figure 14:
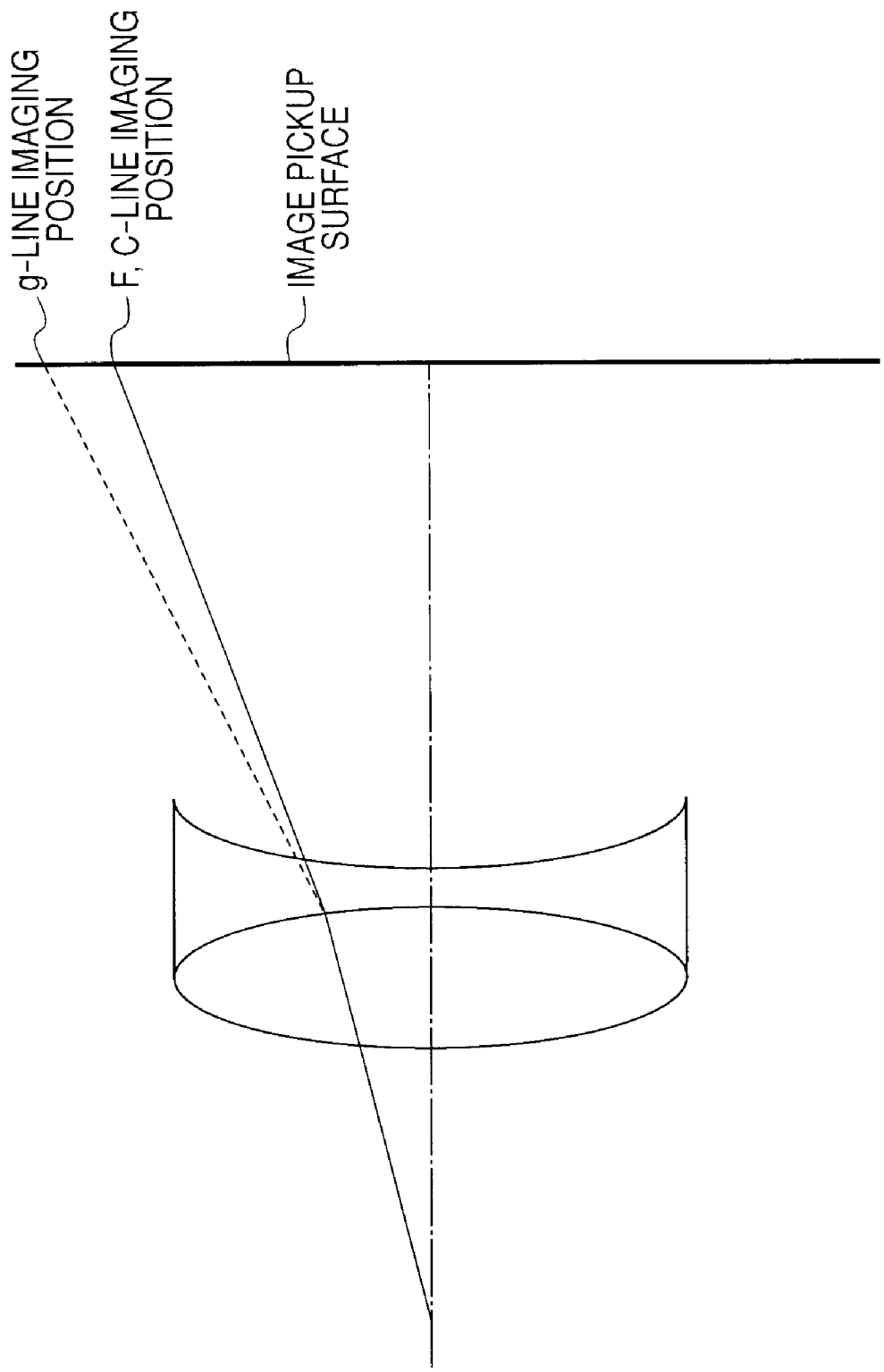
FIG. 14 is a conceptual diagram of a lateral chromatic aberration secondary spectrum.

In general, there is a tendency that the partial dispersion ratio $\theta gF$ becomes larger for a material having a smaller Abbe number $\nu d$. Therefore, $\theta1<\theta2$ is easily satisfied. In this case, there is a tendency that the imaging position of the g-line is shifted toward the image plane side on the axis while the imaging position of the g-line is shifted toward the higher side of the image height in the case of off-axis (FIG. 14) according to the conditional expression (7). In order to reduce the secondary spectrum, the numerator ($\theta1-\theta2$) of the conditional expression (7) should be decreased while the denominator ($\nu1-\nu2$) should be increased.

Therefore, in the embodiments of the present invention, in order to decrease the numerator of the conditional expression (7), one positive lens Lm is made of a material having a small $\nu d$ and a large $\theta gF$ (having a high extraordinary dispersion). Further, in order to increase the denominator of the conditional expression (7) and to maintain "E=0" which is the primary achromatic condition, a material having a large $\nu d$ is used for positive lenses other than the positive lens Lm while a material having a small $\nu d$ is used for negative lenses.

With this configuration, the secondary spectrum of the lateral chromatic aberration can be reduced effectively while correcting the axial chromatic aberration appropriately.

The front lens subunit preferably satisfies the following conditional expression, $$2.1\times10^{-3}<(\theta fn-\theta fp)/(\nu fp-\nu fn)<3.7\times10^{-3} \quad (9),$$

where $\nu fp$ and $\theta fp$ denote an average Abbe number and an average partial dispersion ratio of materials of positive lenses included in the front lens subunit U41 (in the front lens subunit), respectively, and $\nu fn$ and $\theta fn$ denote an average Abbe number and an average partial dispersion ratio of materials of negative lenses included in the front lens subunit (inside the front lens subunit), respectively.

In this way, if both the conditional expressions (1) and (9) are satisfied, both the axial chromatic aberration (in particular, the axial chromatic aberration at the telephoto end) and the lateral chromatic aberration (in particular, the lateral chromatic aberration at the wide-angle end) can be reduced appropriately. As described in the expressions (3) and (4), the front lens subunit has a high correction sharing degree of the axial chromatic aberration. Therefore, the axial chromatic aberration can be reduced effectively by appropriately setting the Abbe numbers of the positive lenses and the negative lenses in the front lens subunit.

Here, it is more preferred to satisfy the following conditional expression.

$$2.11\times10^{-3}<(\theta fn-\theta fp)/(\nu fp-\nu fn)<2.52\times10^{-3} \quad (9a)$$

It is more preferred to satisfy the following conditional expression, $$0.20<\phi m/\phi f<1.10 \quad (10),$$

where $\phi f$ denotes the refractive power of the front lens subunit and $\phi m$ denotes the refractive power of the positive lens Lm.

If the conditional expression (10) is satisfied, the lateral chromatic aberration can be reduced more preferably. If $\phi m/\phi f$ falls below the lower limit of the conditional expression (10), it becomes difficult to reduce the lateral chromatic aberration. In particular, if $\phi f$ increases relative to $\phi m$ with the result that $\phi m/\phi f$ falls below the lower limit of the conditional expression (10), it becomes difficult to secure back focus for a zoom lens system interchangeable with respect to the image pickup apparatus or it becomes difficult to correct the lateral chromatic aberration. On the other hand, if $\phi m$ increases relative to $\phi f$ with the result that $\phi m/\phi f$ exceeds the upper limit of the conditional expression (10), it becomes difficult to reduce the axial chromatic aberration. In addition, if $\phi f$ decreases relative to $\phi m$ with the result that $\phi m/\phi f$ exceeds the upper limit of the conditional expression (10), the effective diameter of the rear lens subunit increases with the result that it becomes difficult to reduce size and weight thereof. In addition, it becomes difficult to reduce both the axial chromatic aberration and the lateral chromatic aberration.

Here, it is more preferred to satisfy the following conditional expression.

$$0.21<\phi m/\phi f<0.60 \quad (10a)$$

It is more preferred that the positive lens Lm having a largest dispersion which is included in the rear lens subunit U42 satisfy the following conditional expressions, $$-1.65\times10^{-3}<(\theta m-0.652)/\nu m<0 \quad (11), \text{ and}$$

$$15<\nu m<30 \quad (12),$$

where $\nu m$ and $\theta m$ denote an Abbe number and a partial dispersion ratio of the positive lens Lm, respectively.

The material of the positive lens Lm having a largest dispersion among the positive lenses included in the rear lens subunit U42 is selected so as to satisfy the conditional expressions (11) and (12) as described above, and hence the achromatic characteristic is performed more effectively.

The optical material satisfying the conditional expression (11) is used for the rear lens subunit U42, and hence chromatic aberration is corrected appropriately over a wide wavelength band between g-line and C-line. In particular, the lateral chromatic aberration at the wide-angle end in the entire optical system is corrected appropriately.

If $(\theta m-0.652)/\nu m$ falls below the lower limit of the conditional expression (11) or $\nu m$ exceeds the upper limit of the conditional expression (12), it becomes difficult for the rear lens subunit U42 having a positive refractive power to have sufficient effect of the achromatic characteristic. In particular, it becomes difficult to obtain sufficient correction effect with respect to the lateral chromatic aberration at the wide-angle end in the entire optical system.

On the contrary, if $(\theta m-0.652)/\nu m$ exceeds the upper limit of the conditional expression (11) or $\nu m$ falls below the lower limit of the conditional expression (12), a balance between the primary achromatic characteristic and the secondary achromatic characteristic in the rear lens subunit U42 having a positive refractive power becomes lost, and hence it becomes difficult to correct both the axial chromatic aberration and the lateral chromatic aberration in the entire optical system.

Here, it is more preferred to satisfy the following conditional expressions.

$$-1.45\times 10^{-3}<(\theta m-0.652)/\nu m<-0.90\times 10^{-3} \quad (11a)$$

$$22.5<\nu m<27.0 \quad (12a)$$

In addition, it is desired to constitute the positive lens having a largest dispersion in the rear lens subunit as a single lens. The positive lens disposed as the single lens in the rear lens subunit U42 may be disposed close to the lens having a negative refractive power, to thereby perform the achromatic characteristic.

In addition, it is desired that the front lens subunit includes at least one positive lens (single lens) and a cemented lens composed of a positive lens and a negative lens.

In addition, it is desired that the zoom lens system be a zoom lens system which forms an image on a photoelectric transducer (on an image pickup element).

Note that it can be conceivable to adopt a method of dividing an element having a distinctive partial dispersion characteristic into multiple lenses having weak refractive powers and locating the multiple lenses, so as to obtain the chromatic aberration correction effect that is equivalent to the chromatic aberration correction effect of the present invention. In this case, the aberration correction ability for the spherical aberration, the coma, and the like can be improved, and a function as an eccentric aberration adjustment mechanism can be added. However, it becomes difficult to achieve a small size and light weight.

In addition, an air interval D between the front lens subunit U41 and the rear lens subunit U42 is set suitable for inserting and removing a magnification-varying optical system (extender, IE, EXT) for changing (changing discontinuously) the focal length range of the entire system. It is desired to satisfy at least one of the following conditional expressions, $$0.15<D/L4 \quad (13), \text{ and}$$

$$-5°<\xi<+5° \quad (14),$$

where L4 denotes a length from the first lens surface to the final lens surface of the fourth lens unit U4, $\xi$ denotes an inclination angle (degree (°)) between the optical axis and an axial marginal beam passing through the air interval between the front lens subunit U41 and the rear lens subunit U42 of the fourth lens unit U4 wherein $\xi=0$ indicates an afocal state, the positive sign is assigned to $\xi$ for the converging light beam (that converges toward the image plane), and the negative sign is assigned to $\xi$ for the diverging light beam (that diverges toward the image plane).

If D/L4 falls below the lower limit of the conditional expression (13), it becomes difficult to secure the air interval necessary for inserting and removing the magnification-varying optical system.

A relatively long back focus is necessary in an optical system which includes a color separation optical system or the like between the lens final surface and the image plane as each embodiment. However, if $\xi$ exceeds the upper limit of the conditional expression (14), it becomes difficult to secure a sufficient length for the back focus. If $\xi$ falls below the lower limit of the conditional expression (14), a divergent angle of the incident light beam becomes too large. As a result, the lens effective diameter of the magnification-varying optical system increases. In addition, it becomes difficult to obtain excellent optical performance.

Here, it is more preferred to satisfy at least one of the following conditional expressions.

$$0.380<D/L4<0.450 \quad (13a)$$

$$+0.40°<\xi<+2.80° \quad (14a)$$

In addition, if a movable section that mainly contributes to magnification-varying (a lens unit which moves in the optical axis direction during varying magnification) is provided in the fourth lens unit U4 having a positive refractive power, the effective diameter of the entire lens system increases and manufacture thereof becomes difficult. It is preferable to satisfy the following conditional expression, $$0.20<\phi m/\phi 4<1.30 \quad (15),$$

where $\phi 4$ represents the refractive power of the fourth lens unit.

If the conditional expression (15) is satisfied, the lateral chromatic aberration can be preferably suppressed. If $\phi m/\phi 4$ is smaller than the lower limit of the conditional (15), it becomes difficult to effectively suppress the lateral chromatic aberration. In particular, if $\phi 4$ is too large, it becomes difficult to secure a sufficient length of back focus. On the other hand, if $\phi m/\phi 4$ is larger than the upper limit of the conditional (15), it becomes difficult to suppress both the axial chromatic aberration and the lateral chromatic aberration simultaneously.

It is preferable to satisfy the following conditional expression, $$0.30<\phi m/\phi r<1.30 \quad (16),$$

where $\phi r$ represents the refractive power of the rear lens subunit.

If the conditional expression (16) is satisfied, the lateral chromatic aberration can be preferably suppressed. If $\phi m/\phi r$ is smaller than the lower limit of the conditional (16), it becomes difficult to effectively suppress the lateral chromatic aberration. In particular, if $\phi r$ is too large, it becomes difficult to secure a sufficient length of back focus. On the other hand, if $\phi m/\phi r$ is larger than the upper limit of the conditional (16), it becomes difficult to suppress both the axial chromatic aberration and the lateral chromatic aberration simultaneously.

It is preferable to satisfy the following conditional expression, $$0.25<\phi m/\phi fp<1.85 \quad (17),$$

where $\phi fp$ represents the average of the refractive powers of the positive lenses included in the front lens subunit.

If the conditional expression (17) is satisfied, the lateral chromatic aberration can be preferably suppressed. If $\phi m/\phi fp$ is smaller than the lower limit of the conditional (17), it becomes difficult to effectively suppress the lateral chromatic aberration. On the other hand, if $\phi m/\phi fp$ is larger than the upper limit of the conditional (17), it becomes difficult to suppress both the axial chromatic aberration and the lateral chromatic aberration simultaneously.

It is preferable to satisfy the following conditional expression, $$-1.50 < \phi m/\phi fn < -0.30 \quad (18),$$

where $\phi fn$ represents the average of the refractive powers of the negative lenses included in the front lens subunit.

If the conditional expression (18) is satisfied, the lateral chromatic aberration can be preferably suppressed. If $\phi m/\phi fn$ is smaller than the lower limit of the conditional (18), it becomes difficult to suppress both the axial chromatic aberration and the lateral chromatic aberration simultaneously. On the other hand, if $\phi m/\phi fn$ is larger than the upper limit of the conditional (18), it becomes difficult to effectively suppress the lateral chromatic aberration.

It is preferable to satisfy the following conditional expression, $$0.30 < \phi m/\phi rp < 0.95 \quad (19),$$

where $\phi rp$ represents the average of the refractive powers of the positive lenses other than the positive lens Lm included in the rear lens subunit.

If the conditional expression (19) is satisfied, the lateral chromatic aberration can be preferably suppressed. If $\phi m/\phi rp$ is smaller than the lower limit of the conditional (19), it becomes difficult to effectively suppress the lateral chromatic aberration. On the other hand, if $\phi m/\phi rp$ is larger than the upper limit of the conditional (19), it becomes difficult to suppress both the axial chromatic aberration and the lateral chromatic aberration simultaneously.

It is preferable to satisfy the following conditional expression, $$-0.60 < \phi m/\phi rn < -0.15 \quad (20),$$

where $\phi rn$ represents the average of the refractive powers of the negative lenses included in the rear lens subunit.

If the conditional expression (20) is satisfied, the lateral chromatic aberration can be preferably suppressed. If $\phi m/\phi rn$ is smaller than the lower limit of the conditional (20), it becomes difficult to suppress both the axial chromatic aberration and the lateral chromatic aberration simultaneously. On the other hand, if $\phi m/\phi rn$ is larger than the upper limit of the conditional (20), it becomes difficult to effectively suppress the lateral chromatic aberration.

The zoom lens system of the present invention is of a zoom type capable of achieving a magnification-varying ratio of from approximately 7× to 40× (preferably, up to approximately 100×), and achieving excellent aberration correction over the entire zoom range with a relatively simple lens structure.

Embodiment 1

FIG. 1 illustrates a structure of a zoom lens system according to Embodiment 1 (Numerical Embodiment 1) of the present invention and an optical path in a state of focusing on an infinite-distance object at the wide-angle end. FIGS. 2A, 2B, and 2C are longitudinal aberration graphs when focused on an object at a distance of 2 m at the wide-angle end, at a focal length of 16.02 mm, and at the telephoto end in Numerical Embodiment 1, respectively.

Here, the value of the focal length and the object distance are values when the numerical embodiment described later are expressed in mm. The object distance is a distance from the image plane. The same applies to the following embodiments.

In the lens optical path diagram, the first lens unit U1 does not move during zooming and has a positive refractive power. The first lens unit U1 has a refractive power for focusing. A whole or a part of the lens unit having the refractive power is moved for focusing.

The second lens unit U2 is a lens unit (variator lens unit) which moves during zooming and has a negative refractive power.

The third lens unit U3 is a lens unit (compensator lens unit) which moves during zooming and has a negative refractive power. This third lens unit U3 moves on the optical axis along with a movement of the second lens unit, to thereby correct the image plane variation accompanying the magnification-varying.

The aperture stop SP is disposed between the third lens unit U3 and the fourth lens unit. The fourth lens unit (relay lens unit) U4 does not move during zooming and has a positive refractive power for forming an image.

The fourth lens unit U4 includes the front lens subunit U41 having a positive refractive power and the rear lens subunit U42 having a positive refractive power with a largest air interval therebetween.

The reference symbol DG indicates a color separation prism or an optical filter illustrated as a glass block. An image plane IP corresponds to the image pickup surface of a solid-state image pickup element (photoelectric transducer).

The lens (optical element) Lm is made of a material (optical material) having an extraordinary dispersion.

In the aberration diagrams, spherical aberrations are illustrated for the g-line, the e-line, the C-line, and the F-line. The astigmatisms are illustrated for a meridional image plane (meri) of the e-line and a sagittal image plane (sagi) of the e-line. The lateral chromatic aberrations are illustrated for the g-line, the C-line, and the F-line. Fno denotes an F number, and ω denotes a half angle of view.

In all of the aberration diagrams, spherical aberration curves are drawn at a scale of 0.2 mm, astigmatism curves are drawn at a scale of 0.2 mm, distortion curves are drawn at a scale of 5%, and lateral chromatic aberration curves are drawn at a scale of 0.05 mm.

In the following embodiments, the wide-angle end and the telephoto end mean zoom positions corresponding to both ends of the mechanically movable range on the optical axis of the second lens unit U2 for changing magnification.

The lens structure described above is the same for each embodiment described below.

In Numerical Embodiment 1 corresponding to Embodiment 1, substituting an Abbe number and a partial dispersion ratio into the conditional expressions (1) and (9) to (14) yields values described in an "Embodiment 1" column of Table 1, and hence all the conditional expressions are satisfied. Therefore, Numerical Embodiment 1 achieves an excellent lateral chromatic aberration at the wide-angle end and an excellent axial chromatic aberration over the entire zoom range.

The lens Lm made of the optical material having the extraordinary dispersion in Numerical Embodiment 1 is disposed in the most object-side in the rear lens subunit U42 as a positive lens. The lateral chromatic aberration is effectively corrected particularly on the wide-angle side.

The front lens subunit U41 includes a positive lens, a positive lens, and a cemented lens composed of a positive lens and a negative lens.

The rear lens subunit U42 includes a positive lens, a cemented lens composed of a negative lens and a positive lens, a cemented lens composed of a positive lens and a negative lens, and a positive lens.

Note that the interval between the front lens subunit U41 and the rear lens subunit U42 is set suitable for inserting and removing the magnification-varying optical system for changing the focal length range of the entire system.

Embodiment 2

Figure 3:
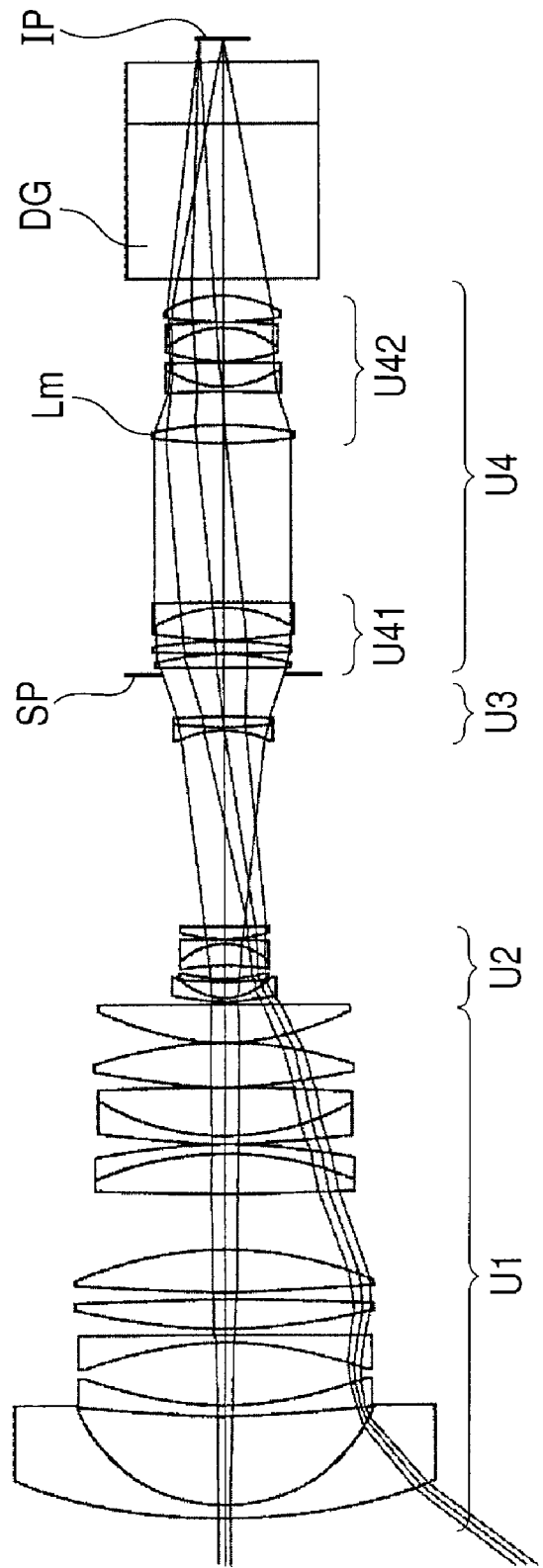
FIG. 3 is an optical path diagram illustrating a zoom lens system according to Embodiment 2 of the present invention in a state of focusing on the infinite-distance object at the wide-angle end.
Figure 4A:
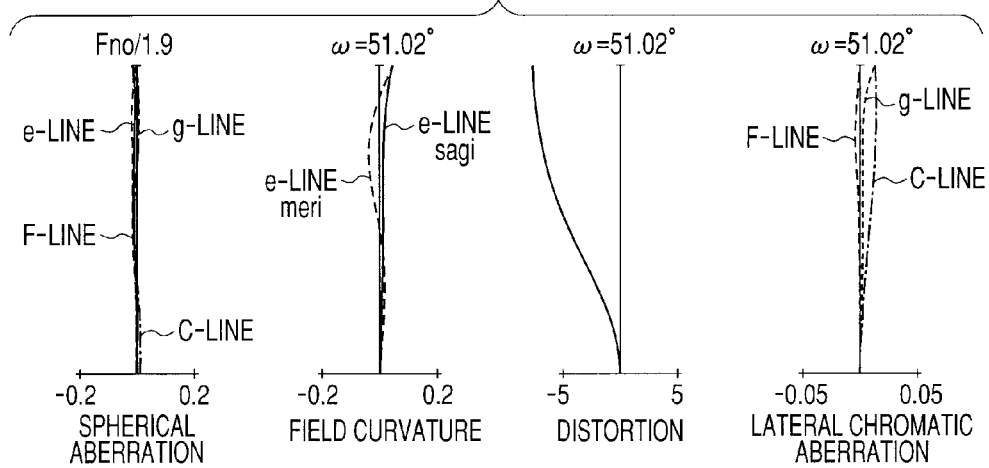
FIG. 4A is a longitudinal aberration graph in Numerical Embodiment 2 of the present invention when the object distance is 2 m at the wide-angle end.
Figure 4B:
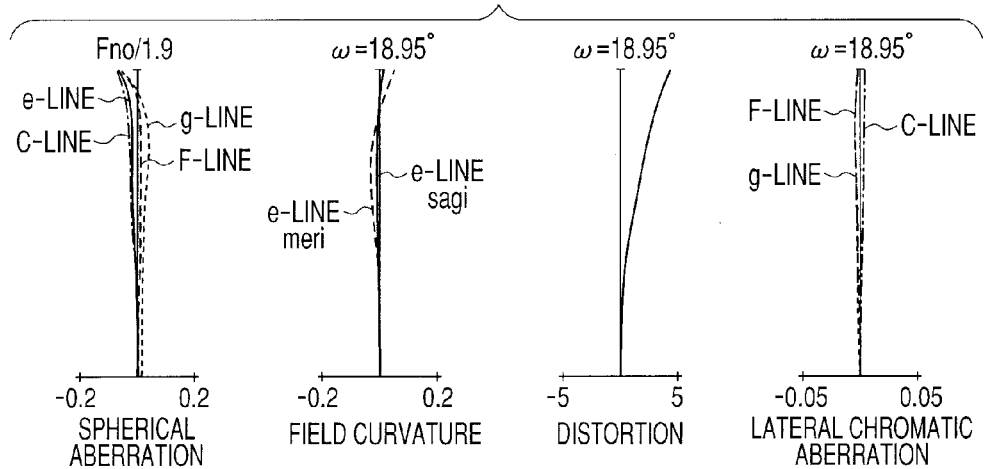
FIG. 4B is a longitudinal aberration graph in Numerical Embodiment 2 when the object distance is 2 m at the focal length of 16.02 mm.
Figure 4C:
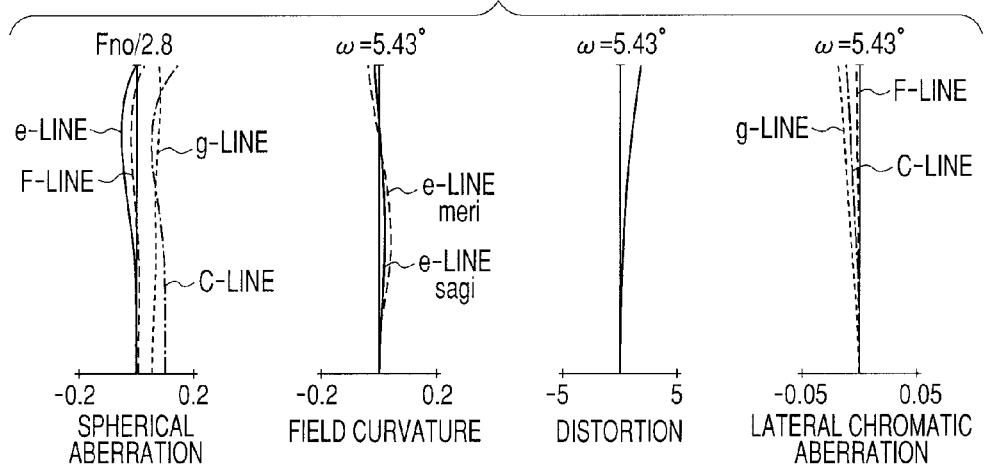
FIG. 4C is a longitudinal aberration graph in Numerical Embodiment 2 when the object distance is 2 m at the telephoto end.

FIG. 3 is an optical path diagram illustrating a zoom lens system according to Embodiment 2 (Numerical Embodiment 2) of the present invention in a state of focusing on the infinite-distance object at the wide-angle end. FIGS. 4A, 4B, and 4C are longitudinal aberration graphs when focusing on an object at a distance of 2 m at the wide-angle end, at a focal length of 16.02 mm, and at the telephoto end in Numerical Embodiment 2, respectively.

In Numerical Embodiment 2 corresponding to Embodiment 2, substituting an Abbe number and a partial dispersion ratio into the conditional expressions (1) and (9) to (14) yields values described in an "Embodiment 2" column of Table 2, and hence all the conditional expressions are satisfied. Therefore, Numerical Embodiment 2 achieves an excellent lateral chromatic aberration at the wide-angle end and an excellent axial chromatic aberration over the entire zoom range.

The lens Lm made of the optical material having the extraordinary dispersion in Numerical Embodiment 2 is disposed in the most object-side in the rear lens subunit U42 as a positive lens. The lateral chromatic aberration is effectively corrected particularly on the wide-angle side.

The front lens subunit U41 and the rear lens subunit U42 each have the same lens structure as in Embodiment 1. However, the material of a lens having the largest dispersion which is included in the rear lens subunit U42 is different between Embodiments 1 and 2.

Compared with Numerical Embodiment 2, The partial dispersion ratio of the lens material having the largest dispersion among the positive lenses included in the rear lens subunit U42 is larger in Numerical Embodiment 1. This enables to correct the lateral chromatic aberration at the wide-angle end more effectively particularly in the entire optical system.

On the other hand, compared with Numerical Embodiment 1, the dispersion of the lens material having the largest dispersion among the positive lenses included in the rear lens subunit U42 is smaller in Numerical Embodiment 2. This enables realizing an excellent correction balance particularly for axial chromatic aberration and a chromatic spherical aberration component over the entire zoom range in the entire optical system.

Note that the interval between the front lens subunit U41 and the rear lens subunit U42 is set suitable for inserting and removing the magnification-varying optical system for changing the focal length range of the entire system.

Embodiment 3

Figure 5:
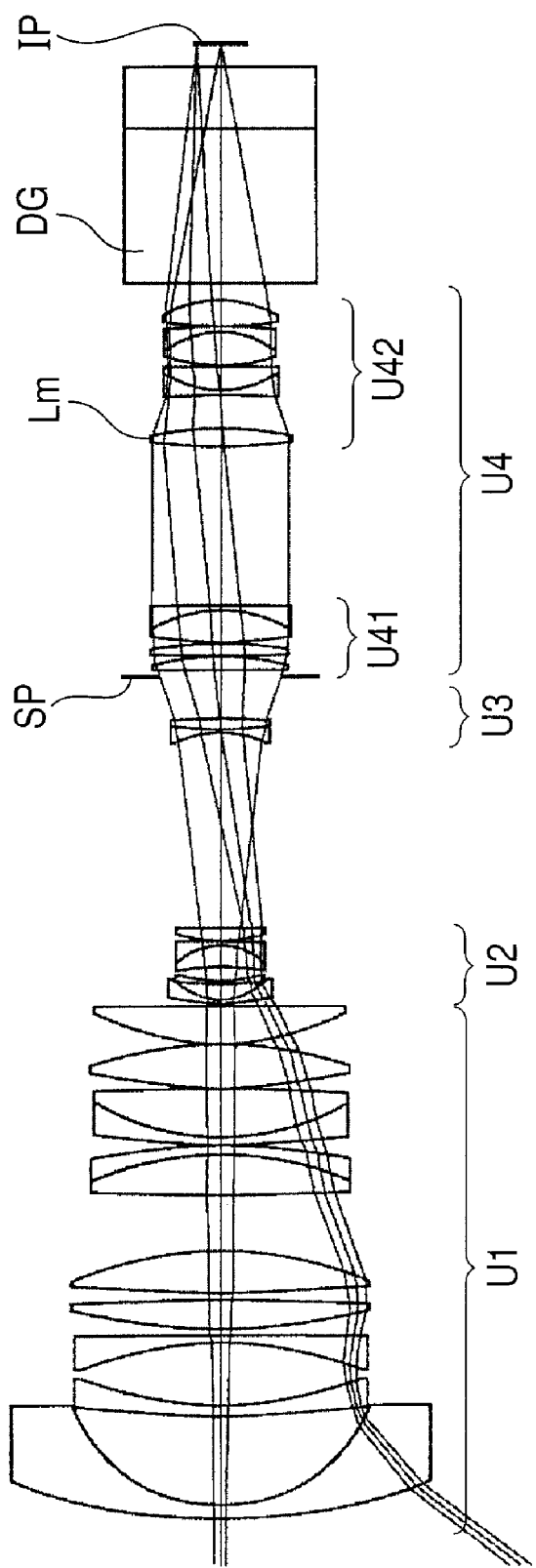
FIG. 5 is an optical path diagram illustrating a zoom lens system according to Embodiment 3 of the present invention in a state of focusing on the infinite-distance object at the wide-angle end.
Figure 6A:
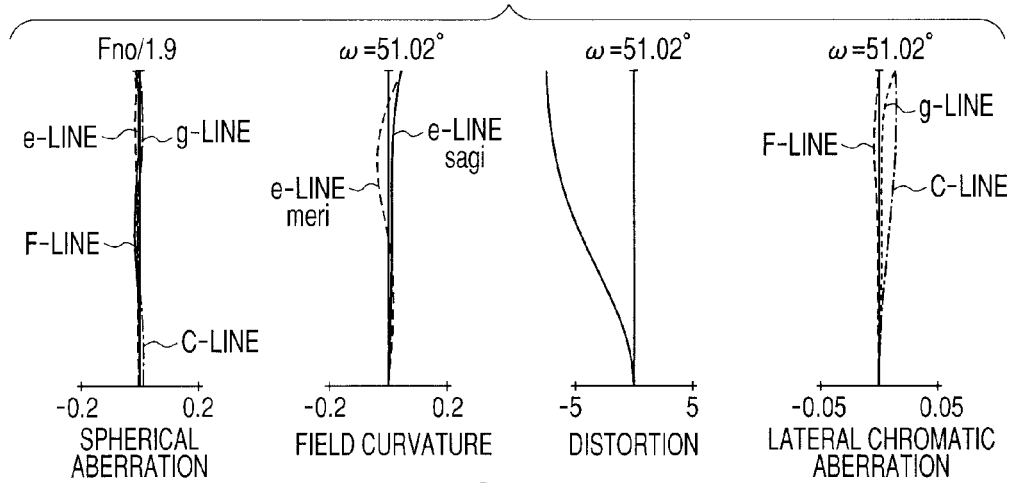
FIG. 6A is a longitudinal aberration graph in Numerical Embodiment 3 of the present invention when the object distance is 2 m at the wide-angle end.
Figure 6B:
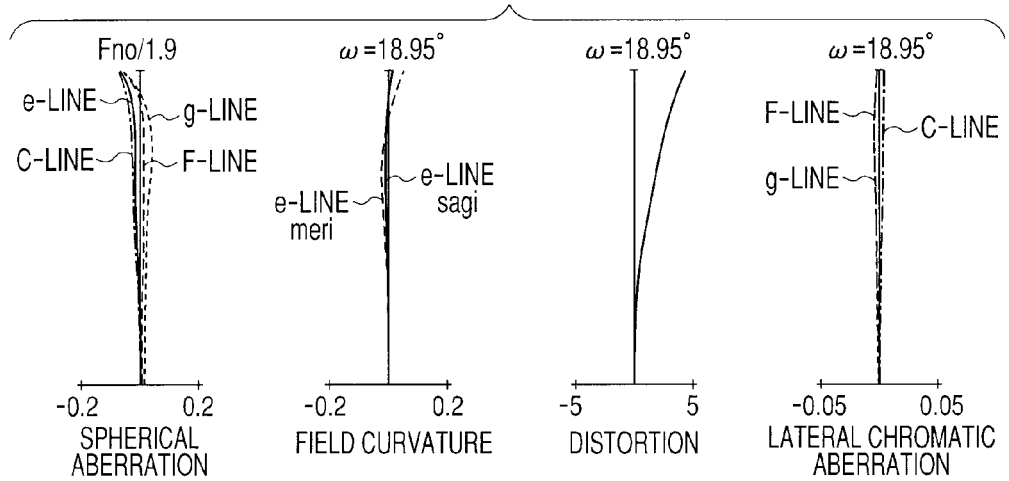
FIG. 6B is a longitudinal aberration graph in Numerical Embodiment 3 when the object distance is 2 m at a focal length of 16.02 mm.
Figure 6C:
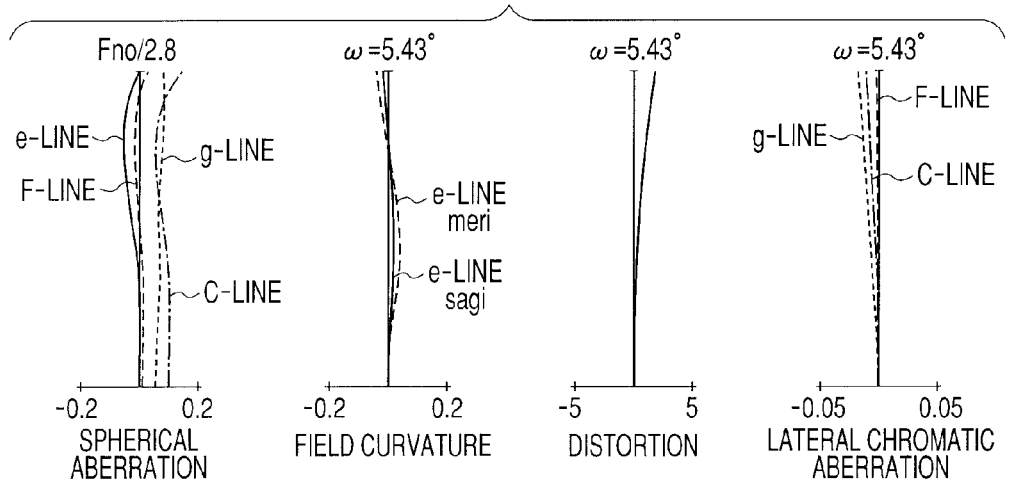
FIG. 6C is a longitudinal aberration graph in Numerical Embodiment 3 when the object distance is 2 m at the telephoto end.

FIG. 5 is an optical path diagram illustrating a zoom lens system according to Embodiment 3 (Numerical Embodiment 3) of the present invention in a state of focusing on the infinite-distance object at the wide-angle end. FIGS. 6A, 6B, and 6C are longitudinal aberration graphs when focusing on an object at a distance of 2 m at the wide-angle end, at a focal length of 16.02 mm, and at the telephoto end in Numerical Embodiment 3, respectively.

In Numerical Embodiment 3 corresponding to Embodiment 3, substituting an Abbe number and a partial dispersion ratio into the conditional expressions (1) and (9) to (14) yields values described in an "Embodiment 3" column of Table 1, and hence all the conditional expressions are satisfied. Therefore, Numerical Embodiment 3 achieves an excellent lateral chromatic aberration at the wide-angle end and an excellent axial chromatic aberration over the entire zoom range.

The lens Lm made of the optical material having the extraordinary dispersion in Numerical Embodiment 3 is disposed in the most object-side in the rear lens subunit U42 as a positive lens. The lateral chromatic aberration is effectively corrected particularly on the wide-angle side.

The lens structures of the front lens subunit U41 and the rear lens subunit U42 are the same as in Embodiments 1 and 2, and the lens having the largest dispersion which is included in the rear lens subunit U42 is the same as in Embodiment 2.

Note that the interval between the front lens subunit U41 and the rear lens subunit U42 is set suitable for inserting and removing the magnification-varying optical system for changing the focal length range of the entire system.

Embodiment 4

Figure 7:
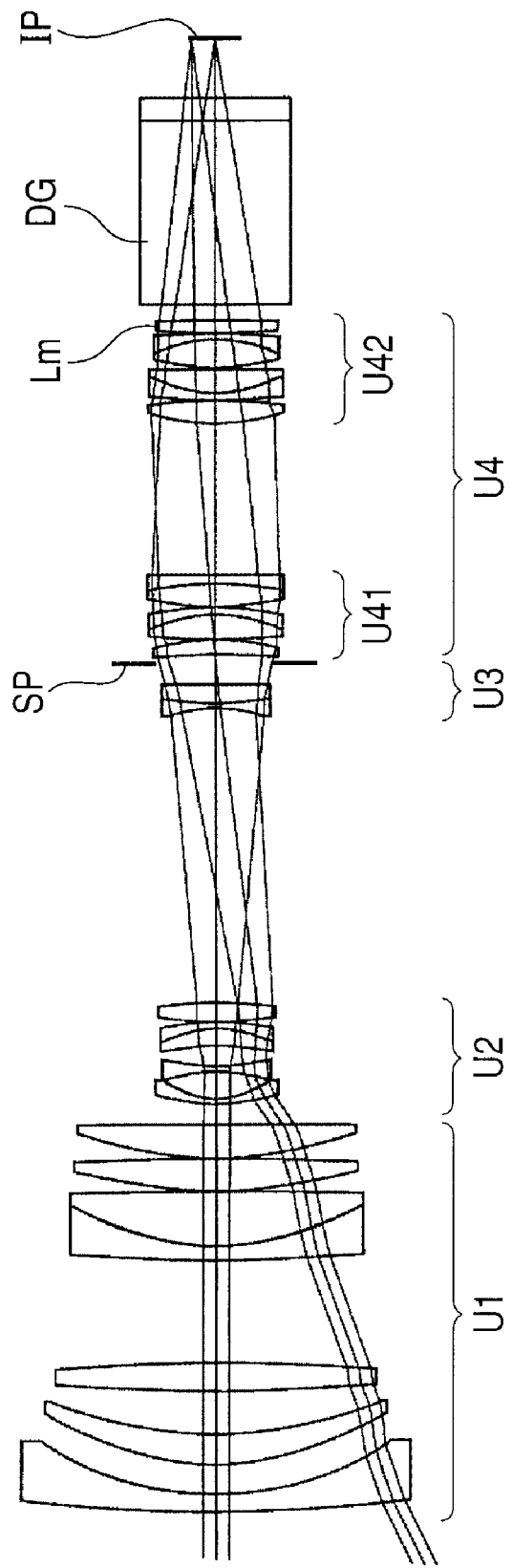
FIG. 7 is an optical path diagram illustrating a zoom lens system according to Embodiment 4 of the present invention in a state of focusing on the infinite-distance object at the wide-angle end.
Figure 8A:
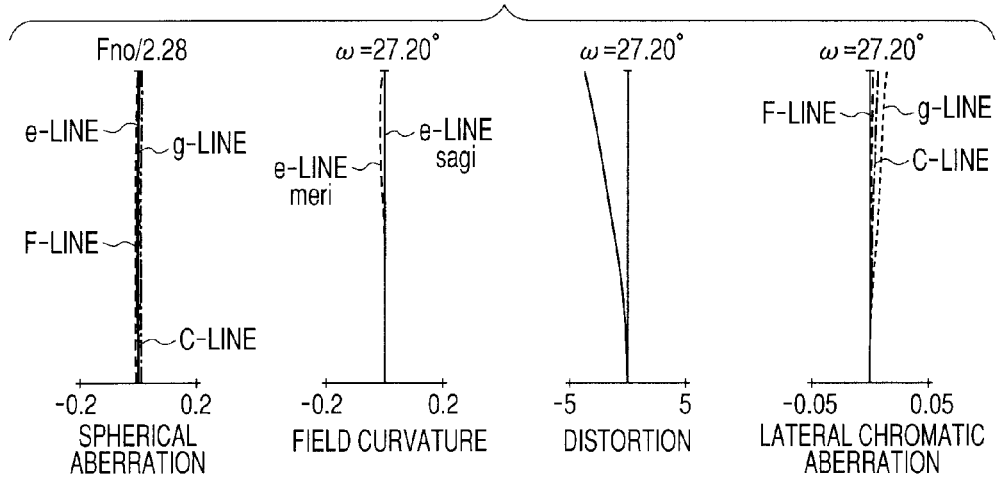
FIG. 8A is a longitudinal aberration graph in Numerical Embodiment 4 of the present invention when the object distance is 6 m at the wide-angle end.
Figure 8B:
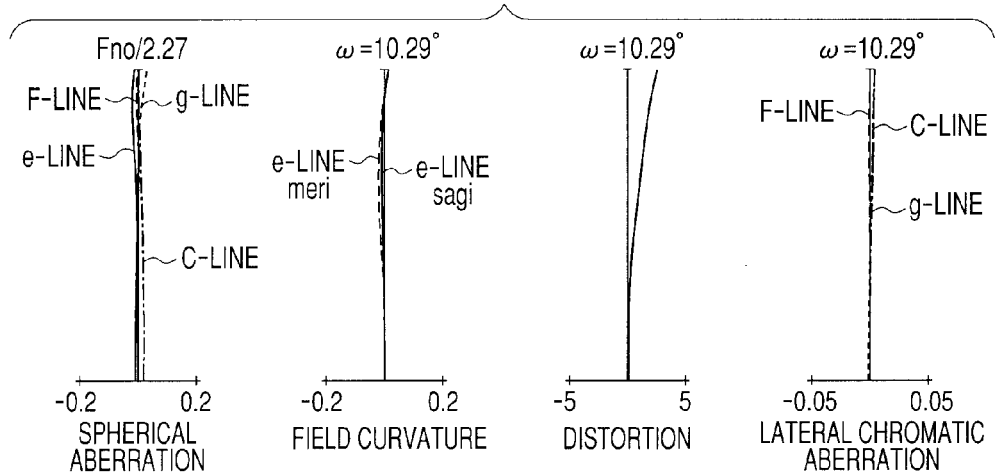
FIG. 8B is a longitudinal aberration graph in Numerical Embodiment 4 when the object distance is 6 m at a focal length of 30.29 mm.
Figure 8C:
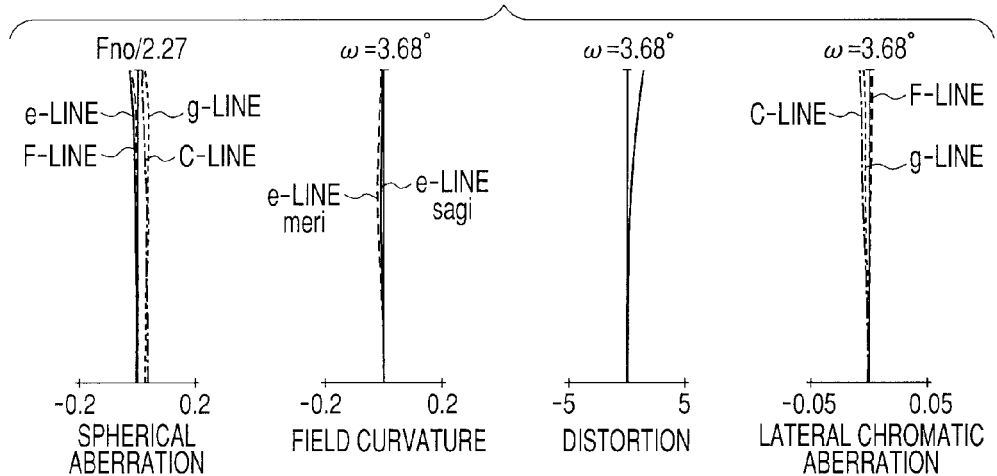
FIG. 8C is a longitudinal aberration graph in Numerical Embodiment 4 when the object distance is 6 m at the telephoto end.

FIG. 7 is an optical path diagram illustrating a zoom lens system according to Embodiment 4 (Numerical Embodiment 4) of the present invention in a state of focusing on the infinite-distance object at the wide-angle end. FIGS. 8A, 8B, and 8C are longitudinal aberration graphs when focusing on an object at a distance of 6 m at the wide-angle end, at a focal length of 30.29 mm, and at the telephoto end in Numerical Embodiment 4, respectively.

In Numerical Embodiment 4 corresponding to Embodiment 4, substituting an Abbe number and a partial dispersion ratio into the conditional expressions (1) and (9) to (14) yields values described in an "Embodiment 4" column of Table 1, and hence all the conditional expressions are satisfied. Therefore, Numerical Embodiment 4 achieves an excellent lateral chromatic aberration at the wide-angle end and an excellent axial chromatic aberration over the entire zoom range.

The lens Lm made of the optical material having the extraordinary dispersion in Numerical Embodiment 4 is disposed in the most image-plane side in the rear lens subunit U42 as a positive lens. The lateral chromatic aberration is effectively corrected particularly on the wide-angle side.

The lens in Embodiment 4 has a smaller zoom ratio than the zoom ratios in Embodiments 1 to 3 and has a zoom configuration specialized in more telephoto side.

The lens structure of the rear lens subunit U42 is the same as in Embodiments 1 to 3, but the front lens subunit U41 includes a positive lens, a cemented lens composed of a positive lens and a negative lens, and a cemented lens composed of a positive lens and a negative lens.

Note that the interval between the front lens subunit U41 and the rear lens subunit U42 is set suitable for inserting and removing the magnification-varying optical system for changing the focal length range of the entire system.

Embodiment 5

Figure 9:
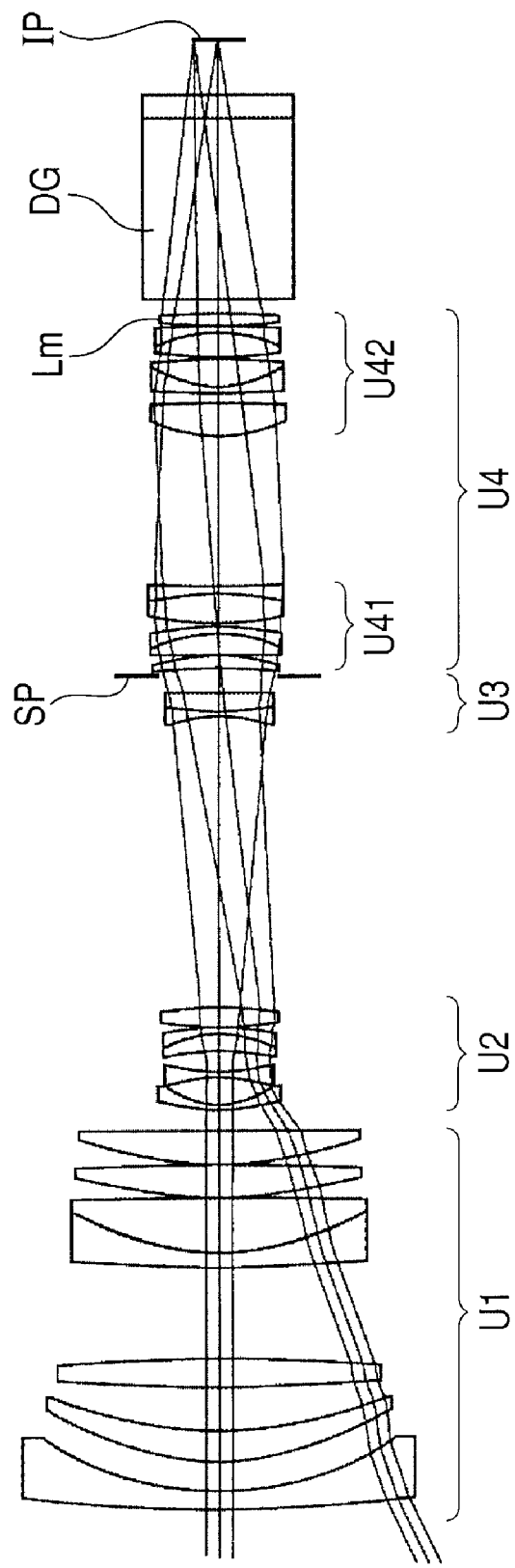
FIG. 9 is an optical path diagram illustrating a zoom lens system according to Embodiment 5 of the present invention in a state of focusing on the infinite-distance object at the wide-angle end.
Figure 10A:
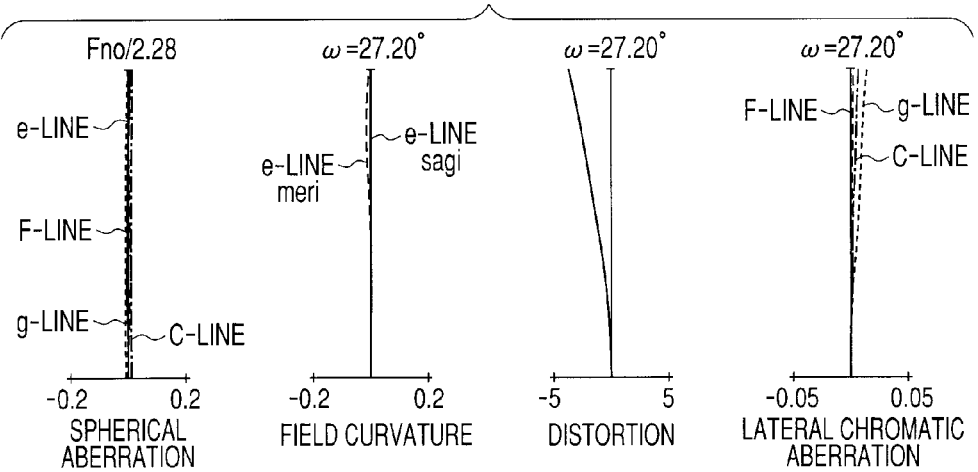
FIG. 10A is a longitudinal aberration graph in Numerical Embodiment 5 of the present invention when the object distance is 6 m at the wide-angle end.
Figure 10B:
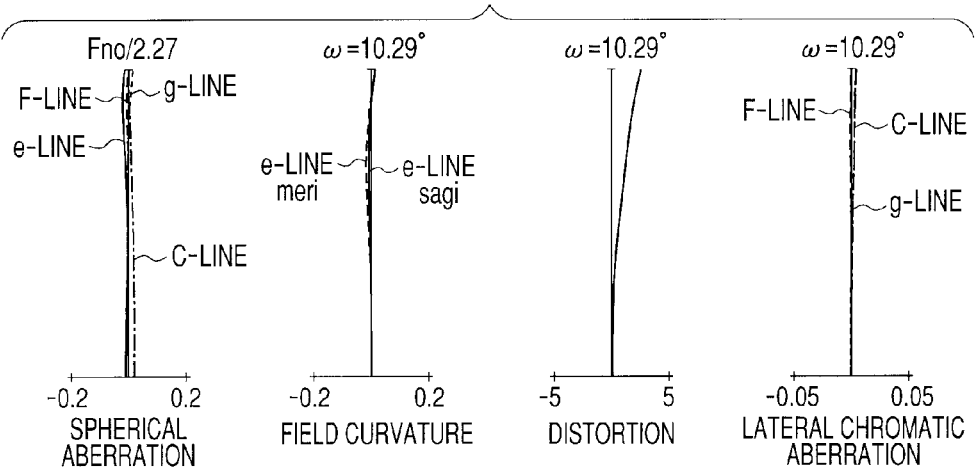
FIG. 10B is a longitudinal aberration graph in Numerical Embodiment 5 when the object distance is 6 m at the focal length of 30.29 mm.
Figure 10C:
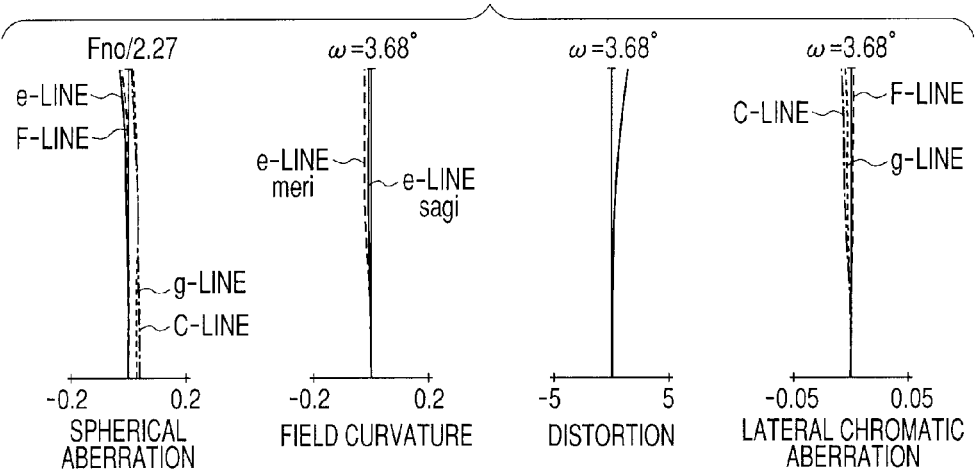
FIG. 10C is a longitudinal aberration graph in Numerical Embodiment 5 when the object distance is 6 m at the telephoto end.

FIG. 9 is an optical path diagram illustrating a zoom lens system according to Embodiment 5 (Numerical Embodiment 5) of the present invention in a state of focusing on the infinite-distance object at the wide-angle end. FIGS. 10A, 10B, and 10C are longitudinal aberration graphs when focusing on an object at a distance of 6 m at the wide-angle end, at a focal length of 30.29 mm, and at the telephoto end in Numerical Embodiment 5, respectively.

In Numerical Embodiment 5 corresponding to Embodiment 5, substituting an Abbe number and a partial dispersion ratio into the conditional expressions (1) and (9) to (14) yields values described in an "Embodiment 5" column of Table 1, and hence all the conditional expressions are satisfied. Therefore, Numerical Embodiment 5 achieves an excellent lateral chromatic aberration at the wide-angle end and an excellent axial chromatic aberration over the entire zoom range.

The lens Lm made of an optical material having the extraordinary dispersion according to Numerical Embodiment 5 is disposed in the most image-plane side in the rear lens subunit U42 as a positive lens. The lateral chromatic aberration is effectively corrected particularly on the wide-angle side.

The lenses in Embodiment 5 are the same as those in Embodiment 4 for the first to third lens units and the arrangement of the positive and negative lenses of the fourth lens unit.

The lens in Embodiment 5 has a larger value of E defined in the expression (6) indicating the refractive power of the lens Lm than the lens in Embodiment 4, and hence the lateral chromatic aberration is more effectively corrected at the wide-angle end.

Note that the interval between the front lens subunit U41 and the rear lens subunit U42 is set suitable for inserting and removing the magnification-varying optical system for changing the focal length range of the entire system.

Embodiment 6

Figure 11:
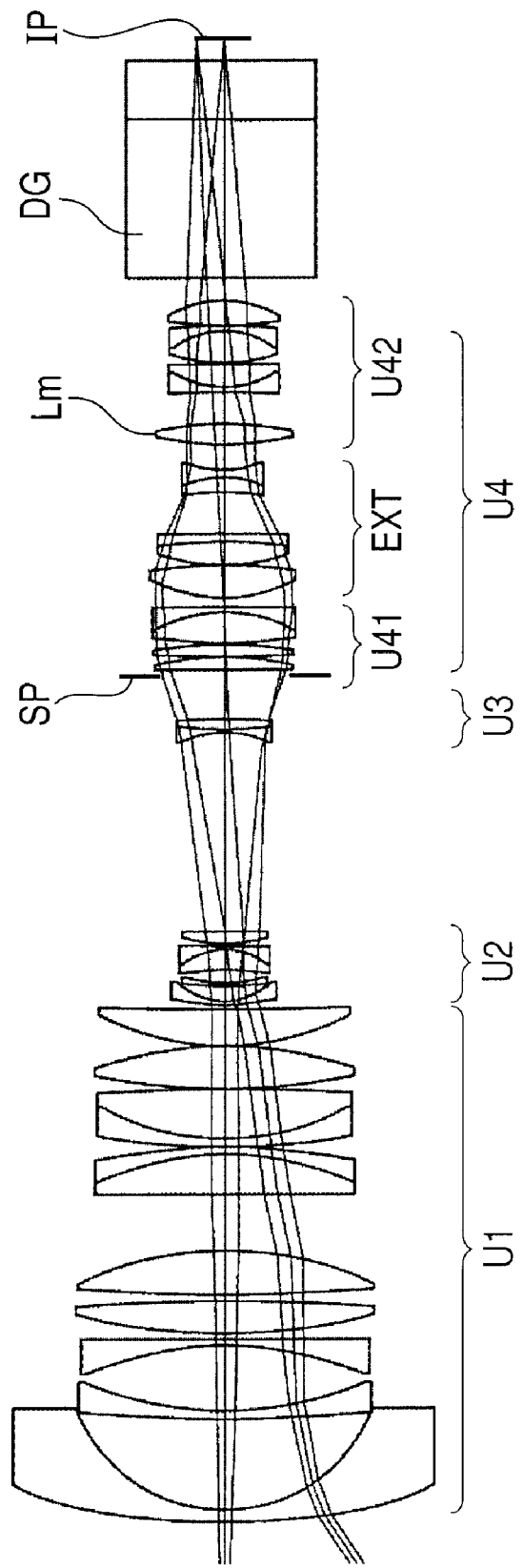
FIG. 11 is an optical path diagram illustrating a zoom lens system according to Embodiment 6 of the present invention in a state of focusing on the infinite-distance object at the wide-angle end.
Figure 12A:
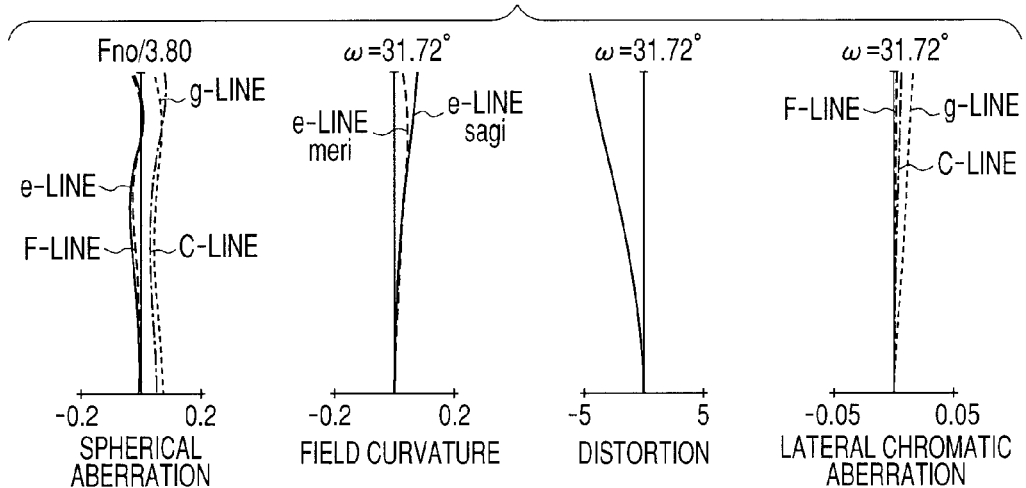
FIG. 12A is a longitudinal aberration graph in Numerical Embodiment 6 of the present invention when the object distance is 2 m at the wide-angle end.
Figure 12B:
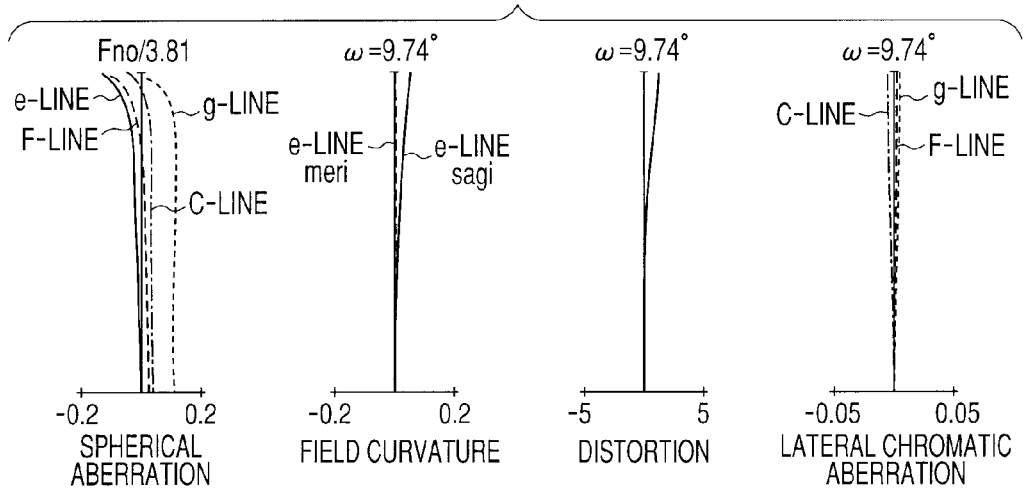
FIG. 12B is a longitudinal aberration graph in Numerical Embodiment 6 when the object distance is 2 m at a focal length of 32.04 mm.
Figure 12C:
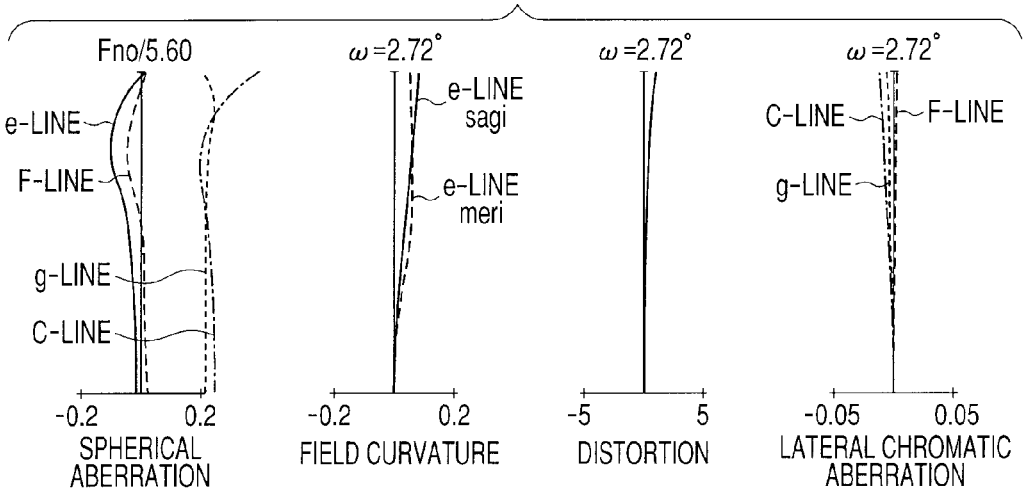
FIG. 12C is a longitudinal aberration graph in Numerical Embodiment 6 when the object distance is 2 m at the telephoto end.

FIG. 11 is an optical path diagram illustrating a zoom lens system according to Embodiment 6 (Numerical Embodiment 6) of the present invention in a state of focusing on the infinite-distance object at the wide-angle end. FIGS. 12A, 12B, and 12C are longitudinal aberration graphs when focusing on an object at a distance of 2 m at the wide-angle end, at a focal length of 32.04 mm, and at the telephoto end in Numerical Embodiment 6, respectively.

In Numerical Embodiment 6 corresponding to Embodiment 6, there is provided a structure in which a magnification-varying optical system is inserted into the largest air interval in the fourth lens unit. The magnification-varying optical system is illustrated in FIG. 11 as an extender (EXT) and can be inserted and removed.

In Numerical Embodiment 6 corresponding to Embodiment 6, substituting an Abbe number and a partial dispersion ratio into the conditional expressions (1) and (9) to (14) yields values described in an "Embodiment 6" column of Table 1, and hence all the conditional expressions are satisfied. Therefore, Numerical Embodiment 6 achieves an excellent lateral chromatic aberration at the wide-angle end and an excellent axial chromatic aberration over the entire zoom range.

Note that the aberration graph of Embodiment 6 has a scale of 0.4 mm for both the spherical aberration and the astigmatism unlike other embodiments.

Embodiment 7

Figure 13:
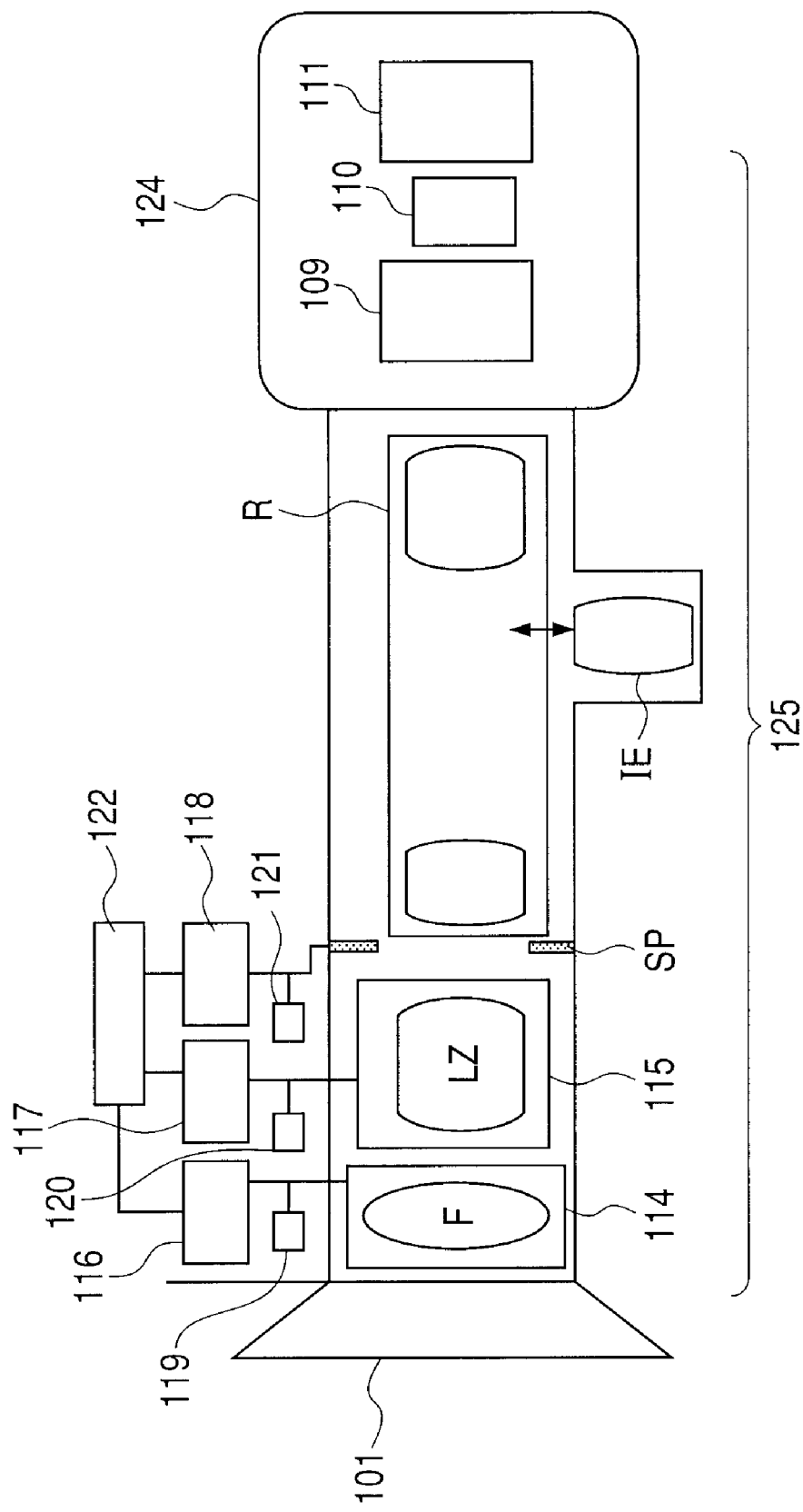
FIG. 13 is a schematic diagram illustrating a main part of an image pickup apparatus according to Embodiment 7 of the present invention.

FIG. 13 is a schematic diagram illustrating a main part of an image pickup apparatus 125 (television camera system) according to Embodiment 7 using the zoom lens system according to each of the embodiments as an image pickup optical system. In FIG. 13, a zoom lens system 101 according to any one of Embodiments 1 to 6 and a camera body 124 are provided, and the zoom lens system 101 is detachably attached to the camera body 124. The image pickup apparatus (image pickup system) 125 is configured by attaching the zoom lens system 101 to the camera body 124. Or, the zoom lens system 101 and the camera body 124 may be configured integrally.

The zoom lens system 101 includes a first lens unit F, a magnification-varying section LZ, and a fourth lens unit R for imaging. The first lens unit F includes a focusing lens unit. The magnification-varying section LZ includes a second lens unit which moves on the optical axis so as to vary the magnification and a third lens unit which moves on the optical axis so as to correct an image plane variation due to magnification-varying.

The zoom lens system 101 includes an aperture stop SP. The fourth lens unit R includes magnification-varying optical system (lens unit) IE which may be inserted onto or removed from the optical path. The magnification-varying optical system IE (EXT) is provided to shift discontinuously the focal length range of the entire system of the zoom lens system 101.

Drive mechanisms 114 and 115 such as helicoids or cams drive the first lens unit F and the magnification-varying section LZ, respectively, in the optical axis direction. Motors (drive units) 116 to 118 are provided to electrically drive the drive mechanisms 114 and 115 and the aperture stop SP. Detectors 119 to 121 such as encoders, potentiometers, or photosensors detect positions of the first lens unit F and the magnification-varying section LZ on the optical axis and a stop diameter of the aperture stop SP.

The camera body 124 includes: a glass block 109 corresponding to an optical filter or a color separation prism; and a solid-state image pickup element (photoelectric transducer) such as a CCD sensor or a CMOS sensor, for receiving a subject image formed by the zoom lens system 101. Further, CPUs 111 and 122 perform various drive controls of the camera body 124 and the main body of the zoom lens system 101, respectively.

When the zoom lens system according to the present invention is applied to the television camera system as described above, the image pickup apparatus having high optical performance is realized.

Hereinafter, Numerical Embodiments 1 to 6 corresponding to Embodiments 1 to 6 of the present invention are described. In the respective numerical embodiments, a surface number "i" is counted from the object side. In addition, ri indicates a curvature radius of an i-th surface counted from the object side and di indicates an interval between the i-th surface and an (i+1)-th surface which are counted from the object side. Further, Ni and vi indicate a refractive index and an Abbe number of an i-th optical material, respectively. Last three surfaces correspond to a glass block such as a filter.

An aspherical surface shape is expressed by the following expression, $$X = \frac{H^2/R}{1+\sqrt{1-(1+k)(H/R)^2}} + A4H^4 + A6H^6 + A8H^8 + A10H^{10} A12H^{12} + A3H^3 + A5H^5 + A7H^7 + A9H^9 + A11H^{11}$$

where assuming that an X-axis is the optical axis direction, an H-axis is a direction perpendicular to the optical axis, and a light traveling direction is positive, R represents a paraxial curvature radius, k represents a conic constant, and A3, A4, A5, A6, A7, A8, A9, A10, A11, and A12 denote aspherical surface coefficients. In the Numerical Embodiments, "e-Z" indicates "×10$^{-z}$", and the mark "*" indicates the aspherical surface.

| (Numerical Embodiment 1) | | | | | |
|---|---|---|---|---|---|
| Surface data | | | | | |
| Surface number | r | d | nd | vd | θgF | Effective diameter |
| 1* | 227.195 | 2.50 | 1.77250 | 49.6 | 0.5521 | 87.70 |
| 2 | 33.736 | 19.76 | | | | 61.84 |
| 3 | 311.589 | 1.85 | 1.75500 | 52.3 | 0.5476 | 61.28 |
| 4 | 80.391 | 13.54 | | | | 58.97 |
| 5 | −80.728 | 1.75 | 1.75500 | 52.3 | 0.5476 | 58.73 |
| 6 | −17642.010 | 1.30 | | | | 60.74 |
| 7 | 135.169 | 6.62 | 1.80518 | 25.4 | 0.6161 | 63.25 |
| 8 | −339.711 | 1.16 | | | | 63.31 |
| 9 | 328.904 | 9.40 | 1.51633 | 64.1 | 0.5352 | 62.99 |
| 10* | −74.094 | 11.86 | | | | 62.84 |
| 11 | 1211.778 | 8.57 | 1.48749 | 70.2 | 0.5300 | 54.63 |
| 12 | −67.682 | 1.65 | 1.88300 | 40.8 | 0.5667 | 54.19 |
| 13 | −126.215 | 0.20 | | | | 54.42 |
| 14 | 182.391 | 1.65 | 2.00330 | 28.3 | 0.5980 | 52.89 |
| 15 | 55.727 | 10.56 | 1.49700 | 81.5 | 0.5375 | 52.39 |
| 16 | −405.898 | 0.20 | | | | 53.25 |
| 17 | 130.732 | 9.01 | 1.49700 | 81.5 | 0.5375 | 54.61 |
| 18 | −91.216 | 0.20 | | | | 54.76 |
| 19 | 57.687 | 7.79 | 1.62041 | 60.3 | 0.5426 | 52.65 |
| 20 | 1234.500 | (Variable) | | | | 51.79 |
| 21 | 52.721 | 0.75 | 1.88300 | 40.8 | 0.5667 | 21.51 |
| 22 | 13.435 | 3.29 | | | | 18.24 |
| 23 | 67.192 | 0.75 | 1.88300 | 40.8 | 0.5667 | 18.10 |
| 24 | 36.490 | 2.83 | | | | 17.67 |
| 25 | −48.656 | 4.75 | 1.80518 | 25.4 | 0.6161 | 17.46 |
| 26 | −12.990 | 0.80 | 1.88300 | 40.8 | 0.5667 | 17.55 |
| 27 | −1003.160 | 0.20 | | | | 18.01 |
| 28 | 33.652 | 2.54 | 1.68893 | 31.1 | 0.6003 | 18.31 |
| 29 | 1299.417 | (Variable) | | | | 18.15 |
| 30 | −26.243 | 0.75 | 1.75500 | 52.3 | 0.5476 | 18.06 |
| 31 | 52.073 | 2.45 | 1.80810 | 22.8 | 0.6307 | 19.53 |
| 32 | −173.421 | (Variable) | | | | 20.04 |
| 33 (Stop) | ∞ | 1.40 | | | | 26.40 |
| 34 | −2344.389 | 3.04 | 1.54814 | 45.8 | 0.5685 | 27.33 |
| 35 | −52.261 | 0.20 | | | | 27.84 |
| 36 | 559.498 | 2.59 | 1.72047 | 34.7 | 0.5834 | 28.67 |
| 37 | −94.784 | 0.20 | | | | 28.92 |
| 38 | 90.102 | 6.95 | 1.72047 | 34.7 | 0.5834 | 29.17 |
| 39 | −29.451 | 1.20 | 1.92286 | 18.9 | 0.6495 | 29.01 |
| 40 | −294.678 | 34.00 | | | | 29.25 |
| 41 | 114.071 | 4.00 | 1.92286 | 18.9 | 0.6495 | 29.48 |
| 42 | −71.194 | 6.81 | | | | 29.30 |
| 43 | −261.853 | 1.20 | 1.88300 | 40.8 | 0.5667 | 23.75 |
| 44 | 21.740 | 5.13 | 1.49700 | 81.5 | 0.5375 | 22.37 |
| 45 | 1783.648 | 0.24 | | | | 22.20 |
| 46 | 35.748 | 7.14 | 1.49700 | 81.5 | 0.5375 | 22.12 |
| 47 | −19.737 | 1.20 | 2.00330 | 28.3 | 0.5980 | 21.88 |
| 48 | −140.247 | 0.15 | | | | 22.89 |
| 49 | 90.253 | 5.55 | 1.49700 | 81.5 | 0.5375 | 23.35 |
| 50 | −26.510 | 4.00 | | | | 23.62 |
| 51 | ∞ | 33.00 | 1.60859 | 46.4 | 0.5664 | 40.00 |
| 52 | ∞ | 13.20 | 1.51680 | 64.2 | 0.5347 | 40.00 |
| 53 | ∞ | (Variable) | | | | 40.00 |
| Image plane | ∞ | | | | | |

Aspherical surface data

First surface

K = −5.42173e+001    A4 = 1.90661e−006    A6 = 3.73103e−011    A8 = −1.91524e−013
A10 = −6.77526e−019
A3 = −4.12872e−006    A5 = −1.32181e−008    A7 = 2.42261e−012    A9 = 2.44378e−015

Tenth surface

K = −2.28238e+000    A4 = −2.08837e−007    A6 = 2.96604e−011    A8 = 3.48782e−013
A10 = −1.18721e−016
A3 = −6.36724e−007    A5 = 5.61037e−010    A7 = −1.11164e−011    A9 = −3.18271e−016

-continued (Numerical Embodiment 1)

Various data
Zoom ratio 13.00

|  | Wide-angle | Intermediate | Telephoto |
|---|---|---|---|
| Focal length | 4.45 | 16.02 | 57.85 |
| F number | 1.90 | 1.90 | 2.80 |
| Field angle | 51.02 | 18.95 | 0.00 |
| Image height | 5.50 | 5.50 | 0.00 |
| Total lens length | 300.03 | 300.03 | 300.03 |
| BF | 38.16 | 38.16 | 38.16 |
| d20 | 0.91 | 31.10 | 44.72 |
| d29 | 42.27 | 8.63 | 6.22 |
| d32 | 9.00 | 12.46 | 1.24 |
| d53 | 4.99 | 4.99 | 4.99 |
| Incident pupil position | 34.85 | 53.95 | 97.66 |
| Exit pupil position | 724.89 | 724.89 | 724.89 |
| Front principal point position | 39.33 | 70.32 | 160.16 |
| Rear principal point position | 0.54 | −11.03 | −52.86 |

Zoom lens unit data

| Unit | Most-object-side surface | Focal length | Lens structure length | Front principal point position | Rear principal point position |
|---|---|---|---|---|---|
| 1 | 1 | 26.80 | 109.58 | 47.04 | 36.95 |
| 2 | 21 | −16.80 | 15.91 | 0.43 | −11.92 |
| 3 | 30 | −43.80 | 3.20 | −0.39 | −2.18 |
| 4 | 33 | 52.90 | 131.20 | 56.46 | −113.55 |

(Numerical Embodiment 2)

Surface data

| Surface number | R | d | nd | vd | θgF | Effective diameter |
|---|---|---|---|---|---|---|
| 1* | 227.195 | 2.50 | 1.77250 | 49.6 | 0.5521 | 87.70 |
| 2 | 33.736 | 19.76 |  |  |  | 61.84 |
| 3 | 311.589 | 1.85 | 1.75500 | 52.3 | 0.5476 | 61.28 |
| 4 | 80.391 | 13.54 |  |  |  | 58.97 |
| 5 | −80.728 | 1.75 | 1.75500 | 52.3 | 0.5476 | 58.73 |
| 6 | −17642.010 | 1.30 |  |  |  | 60.74 |
| 7 | 135.169 | 6.62 | 1.80518 | 25.4 | 0.6161 | 63.25 |
| 8 | −339.711 | 1.16 |  |  |  | 63.31 |
| 9 | 328.904 | 9.40 | 1.51633 | 64.1 | 0.5352 | 62.99 |
| 10* | −74.094 | 11.86 |  |  |  | 62.84 |
| 11 | 1211.778 | 8.57 | 1.48749 | 70.2 | 0.5300 | 54.63 |
| 12 | −67.682 | 1.65 | 1.88300 | 40.8 | 0.5667 | 54.19 |
| 13 | −126.215 | 0.20 |  |  |  | 54.42 |
| 14 | 182.391 | 1.65 | 2.00330 | 28.3 | 0.5980 | 52.89 |
| 15 | 55.727 | 10.56 | 1.49700 | 81.5 | 0.5375 | 52.39 |
| 16 | −405.898 | 0.20 |  |  |  | 53.25 |
| 17 | 130.732 | 9.01 | 1.49700 | 81.5 | 0.5375 | 54.61 |
| 18 | −91.216 | 0.20 |  |  |  | 54.76 |
| 19 | 57.687 | 7.79 | 1.62041 | 60.3 | 0.5426 | 52.65 |
| 20 | 1234.500 | (Variable) |  |  |  | 51.79 |
| 21 | 52.721 | 0.75 | 1.88300 | 40.8 | 0.5667 | 21.51 |
| 22 | 13.435 | 3.29 |  |  |  | 18.24 |
| 23 | 67.192 | 0.75 | 1.88300 | 40.8 | 0.5667 | 18.10 |
| 24 | 36.490 | 2.83 |  |  |  | 17.67 |
| 25 | −48.656 | 4.75 | 1.80518 | 25.4 | 0.6161 | 17.46 |
| 26 | −12.990 | 0.80 | 1.88300 | 40.8 | 0.5667 | 17.55 |
| 27 | −1003.160 | 0.20 |  |  |  | 18.01 |
| 28 | 33.652 | 2.54 | 1.68893 | 31.1 | 0.6003 | 18.31 |
| 29 | 1299.417 | (Variable) |  |  |  | 18.15 |
| 30 | −26.243 | 0.75 | 1.75500 | 52.3 | 0.5476 | 18.06 |
| 31 | 52.073 | 2.45 | 1.80810 | 22.8 | 0.6307 | 19.53 |
| 32 | −173.421 | (Variable) |  |  |  | 20.04 |
| 33 | ∞ | 1.40 |  |  |  | 26.40 |

-continued (Numerical Embodiment 2)

| | | | | | | |
|---|---|---|---|---|---|---|
| (Stop) | | | | | | |
| 34 | −6210.608 | 3.48 | 1.51742 | 52.4 | 0.5564 | 27.34 |
| 35 | −43.230 | 0.20 | | | | 27.87 |
| 36 | 131.811 | 2.86 | 1.51742 | 52.4 | 0.5564 | 28.91 |
| 37 | −139.192 | 0.20 | | | | 29.07 |
| 38 | 60.741 | 6.91 | 1.51742 | 52.4 | 0.5564 | 29.31 |
| 39 | −35.821 | 1.20 | 1.80810 | 22.8 | 0.6307 | 29.08 |
| 40 | −219.130 | 34.00 | | | | 29.28 |
| 41 | 71.936 | 4.28 | 1.84666 | 23.8 | 0.6205 | 28.71 |
| 42 | −77.529 | 6.46 | | | | 28.41 |
| 43 | −69.616 | 1.20 | 1.88300 | 40.8 | 0.5667 | 23.34 |
| 44 | 24.451 | 5.56 | 1.48749 | 70.2 | 0.5300 | 22.36 |
| 45 | −79.972 | 0.24 | | | | 22.39 |
| 46 | 46.903 | 6.56 | 1.49700 | 81.5 | 0.5375 | 22.61 |
| 47 | −23.655 | 1.20 | 2.00330 | 28.3 | 0.5980 | 22.46 |
| 48 | −111.207 | 0.15 | | | | 23.22 |
| 49 | 88.163 | 5.09 | 1.49700 | 81.5 | 0.5375 | 23.59 |
| 50 | −31.853 | 4.00 | | | | 23.72 |
| 51 | ∞ | 33.00 | 1.60859 | 46.4 | 0.5664 | 40.00 |
| 52 | ∞ | 13.20 | 1.51680 | 64.2 | 0.5347 | 40.00 |
| 53 | ∞ | (Variable) | | | | 40.00 |
| Image plane | ∞ | | | | | |

Aspherical surface data

First surface $K = -5.42173e+001$  $A4 = 1.90661e-006$  $A6 = 3.73103e-011$  $A8 = -1.91524e-013$
$A10 = -6.77526e-019$
$A3 = -4.12872e-006$  $A5 = -1.32181e-008$  $A7 = 2.42261e-012$  $A9 = 2.44378e-015$ Tenth surface $K = -2.28238e+000$  $A4 = -2.08837e-007$  $A6 = 2.96604e-011$  $A8 = 3.48782e-013$
$A10 = -1.18721e-016$
$A3 = -6.36724e-007$  $A5 = 5.61037e-010$  $A7 = -1.11164e-011$  $A9 = -3.18271e-016$ Various data
Zoom ratio 13.00

| | Wide-angle | Intermediate | Telephoto |
|---|---|---|---|
| Focal length | 4.45 | 16.02 | 57.85 |
| F number | 1.90 | 1.90 | 2.80 |
| Field angle | 51.02 | 18.95 | 0.00 |
| Image height | 5.50 | 5.50 | 0.00 |
| Total lens length | 300.04 | 300.04 | 300.04 |
| BF | 38.17 | 38.17 | 38.17 |
| d20 | 0.91 | 31.10 | 44.72 |
| d29 | 42.27 | 8.63 | 6.22 |
| d32 | 9.00 | 12.46 | 1.24 |
| d53 | 5.00 | 5.00 | 5.00 |
| Incident pupil position | 34.85 | 53.95 | 97.66 |
| Exit pupil position | 502.92 | 502.92 | 502.92 |
| Front principal point position | 39.34 | 70.48 | 162.23 |
| Rear principal point position | 0.55 | −11.02 | −52.85 |

Zoom lens unit data

| Unit | Most-object-side surface | Focal length | Lens structure length | Front principal point position | Rear principal point position |
|---|---|---|---|---|---|
| 1 | 1 | 26.80 | 109.58 | 47.04 | 36.95 |
| 2 | 21 | −16.80 | 15.91 | 0.43 | −11.92 |
| 3 | 30 | −43.80 | 3.20 | −0.39 | −2.18 |
| 4 | 33 | 55.14 | 131.20 | 60.51 | −118.56 |

| (Numerical Embodiment 3) | | | | | | |
|---|---|---|---|---|---|---|
| Surface number | r | d | nd | vd | θgF | Effective diameter |
| 1* | 227.195 | 2.50 | 1.77250 | 49.6 | 0.5521 | 87.70 |
| 2 | 33.736 | 19.76 | | | | 61.84 |
| 3 | 311.589 | 1.85 | 1.75500 | 52.3 | 0.5476 | 61.28 |
| 4 | 80.391 | 13.54 | | | | 58.97 |
| 5 | −80.728 | 1.75 | 1.75500 | 52.3 | 0.5476 | 58.73 |
| 6 | −17642.010 | 1.30 | | | | 60.74 |
| 7 | 135.169 | 6.62 | 1.80518 | 25.4 | 0.6161 | 63.25 |
| 8 | −339.711 | 1.16 | | | | 63.31 |
| 9 | 328.904 | 9.40 | 1.51633 | 64.1 | 0.5352 | 62.99 |
| 10* | −74.094 | 11.86 | | | | 62.84 |
| 11 | 1211.778 | 8.57 | 1.48749 | 70.2 | 0.5300 | 54.63 |
| 12 | −67.682 | 1.65 | 1.88300 | 40.8 | 0.5667 | 54.19 |
| 13 | −126.215 | 0.20 | | | | 54.42 |
| 14 | 182.391 | 1.65 | 2.00330 | 28.3 | 0.5980 | 52.89 |
| 15 | 55.727 | 10.56 | 1.49700 | 81.5 | 0.5375 | 52.39 |
| 16 | −405.898 | 0.20 | | | | 53.25 |
| 17 | 130.732 | 9.01 | 1.49700 | 81.5 | 0.5375 | 54.61 |
| 18 | −91.216 | 0.20 | | | | 54.76 |
| 19 | 57.687 | 7.79 | 1.62041 | 60.3 | 0.5426 | 52.65 |
| 20 | 1234.500 | (Variable) | | | | 51.79 |
| 21 | 52.721 | 0.75 | 1.88300 | 40.8 | 0.5667 | 21.51 |
| 22 | 13.435 | 3.29 | | | | 18.24 |
| 23 | 67.192 | 0.75 | 1.88300 | 40.8 | 0.5667 | 18.10 |
| 24 | 36.490 | 2.83 | | | | 17.67 |
| 25 | −48.656 | 4.75 | 1.80518 | 25.4 | 0.6161 | 17.46 |
| 26 | −12.990 | 0.80 | 1.88300 | 40.8 | 0.5667 | 17.55 |
| 27 | −1003.160 | 0.20 | | | | 18.01 |
| 28 | 33.652 | 2.54 | 1.68893 | 31.1 | 0.6003 | 18.31 |
| 29 | 1299.417 | (Variable) | | | | 18.15 |
| 30 | −26.243 | 0.75 | 1.75500 | 52.3 | 0.5476 | 18.06 |
| 31 | 52.073 | 2.45 | 1.80810 | 22.8 | 0.6307 | 19.53 |
| 32 | −173.421 | (Variable) | | | | 20.04 |
| 33 (Stop) | ∞ | 1.40 | | | | 26.40 |
| 34 | 74917.413 | 3.48 | 1.53172 | 48.8 | 0.5630 | 27.36 |
| 35 | −43.582 | 0.20 | | | | 27.87 |
| 36 | 120.353 | 3.49 | 1.53172 | 48.8 | 0.5630 | 28.90 |
| 37 | −80.921 | 0.20 | | | | 29.04 |
| 38 | 55.956 | 6.65 | 1.53172 | 48.8 | 0.5630 | 28.96 |
| 39 | −38.300 | 1.20 | 1.84666 | 23.8 | 0.6205 | 28.56 |
| 40 | 657.884 | 34.00 | | | | 28.47 |
| 41 | 84.421 | 4.17 | 1.84666 | 23.8 | 0.6205 | 28.30 |
| 42 | −68.461 | 5.37 | | | | 28.06 |
| 43 | −84.755 | 1.20 | 1.88300 | 40.8 | 0.5667 | 23.78 |
| 44 | 24.694 | 5.66 | 1.48749 | 70.2 | 0.5300 | 22.73 |
| 45 | −72.325 | 0.24 | | | | 22.72 |
| 46 | 43.202 | 6.81 | 1.49700 | 81.5 | 0.5375 | 22.86 |
| 47 | −21.609 | 1.20 | 1.90366 | 31.3 | 0.5947 | 22.63 |
| 48 | −585.336 | 0.20 | | | | 23.38 |
| 49 | 73.112 | 5.54 | 1.48749 | 70.2 | 0.5300 | 23.77 |
| 50 | −29.309 | 4.00 | | | | 23.94 |
| 51 | ∞ | 33.00 | 1.60859 | 46.4 | 0.5664 | 40.00 |
| 52 | ∞ | 13.20 | 1.51680 | 64.2 | 0.5347 | 40.00 |
| 53 | ∞ | (Variable) | | | | 40.00 |
| Image plane | ∞ | | | | | |

Aspherical surface data

First surface

K = −5.42173e+001   A4 = 1.90661e−006   A6 = 3.73103e−011   A8 = −1.91524e−013
A10 = −6.77526e−019
A3 = −4.12872e−006   A5 = −1.32181e−008   A7 = 2.42261e−012   A9 = 2.44378e−015

Tenth surface

K = −2.28238e+000   A4 = −2.08837e−007   A6 = 2.96604e−011   A8 = 3.48782e−013
A10 = −1.18721e−016
A3 = −6.36724e−007   A5 = 5.61037e−010   A7 = −1.11164e−011   A9 = −3.18271e−016

-continued (Numerical Embodiment 3)

Various data
Zoom ratio 13.00

|  | Wide-angle | Intermediate | Telephoto |
|---|---|---|---|
| Focal length | 4.45 | 16.02 | 57.85 |
| F number | 1.90 | 1.90 | 2.80 |
| Field angle | 51.02 | 18.95 | 5.43 |
| Image height | 5.50 | 5.50 | 5.50 |
| Total lens length | 300.04 | 300.04 | 300.04 |
| BF | 38.17 | 38.17 | 38.17 |
| d20 | 0.91 | 31.10 | 44.72 |
| d29 | 42.27 | 8.63 | 6.22 |
| d32 | 9.00 | 12.46 | 1.24 |
| d53 | 5.00 | 5.00 | 5.00 |
| Incident pupil position | 34.85 | 53.95 | 97.66 |
| Exit pupil position | 432.51 | 432.51 | 432.51 |
| Front principal point position | 39.35 | 70.57 | 163.34 |
| Rear principal point position | 0.55 | −11.02 | −52.85 |

Zoom lens unit data

| Unit | Most-object-side surface | Focal length | Lens structure length | Front principal point position | Rear principal point position |
|---|---|---|---|---|---|
| 1 | 1 | 26.80 | 109.58 | 47.04 | 36.95 |
| 2 | 21 | −16.80 | 15.91 | 0.43 | −11.92 |
| 3 | 30 | −43.80 | 3.20 | −0.39 | −2.18 |
| 4 | 33 | 56.42 | 131.20 | 62.82 | −121.43 |

(Numerical Embodiment 4)

Surface data

| Surface number | r | d | nd | vd | θgF | Effective diameter |
|---|---|---|---|---|---|---|
| 1 | 348.182 | 3.86 | 1.77250 | 49.6 | 0.5521 | 78.53 |
| 2 | 65.248 | 6.25 |  |  |  | 70.54 |
| 3 | 65.578 | 6.13 | 1.75520 | 27.5 | 0.6103 | 69.19 |
| 4 | 97.706 | 8.94 |  |  |  | 67.70 |
| 5 | 612.487 | 5.45 | 1.49700 | 81.5 | 0.5375 | 65.53 |
| 6 | −416.776 | 20.81 |  |  |  | 64.14 |
| 7 | 373.686 | 2.97 | 1.69895 | 30.1 | 0.6029 | 59.10 |
| 8 | 58.828 | 11.20 | 1.43875 | 95.0 | 0.5342 | 57.56 |
| 9 | −578.845 | 0.12 |  |  |  | 57.57 |
| 10 | 113.463 | 6.31 | 1.43875 | 95.0 | 0.5342 | 57.41 |
| 11 | −693.179 | 0.12 |  |  |  | 57.04 |
| 12 | 81.228 | 7.09 | 1.77250 | 49.6 | 0.5521 | 56.42 |
| 13 | −911.265 | (Variable) |  |  |  | 55.84 |
| 14 | 47.769 | 1.19 | 1.77250 | 49.6 | 0.5521 | 23.96 |
| 15 | 19.993 | 5.13 |  |  |  | 21.26 |
| 16 | −37.085 | 1.19 | 1.77250 | 49.6 | 0.5521 | 20.80 |
| 17 | 37.085 | 4.25 |  |  |  | 20.22 |
| 18 | −44.595 | 3.54 | 1.72825 | 28.5 | 0.6077 | 20.54 |
| 19 | −24.436 | 1.19 | 1.77250 | 49.6 | 0.5521 | 21.25 |
| 20 | −72.930 | 0.12 |  |  |  | 22.15 |
| 21 | 74.058 | 4.17 | 1.67270 | 32.1 | 0.5988 | 22.78 |
| 22 | −70.755 | (Variable) |  |  |  | 22.94 |
| 23 | −35.850 | 1.07 | 1.77250 | 49.6 | 0.5521 | 19.03 |
| 24 | 56.162 | 3.95 | 1.84666 | 23.8 | 0.6205 | 20.13 |
| 25 | −516.532 | (Variable) |  |  |  | 21.02 |
| 26 (Stop) | ∞ | 1.86 |  |  |  | 23.29 |
| 27 | −217.157 | 3.27 | 1.64000 | 60.1 | 0.5372 | 24.12 |
| 28 | −41.752 | 0.12 |  |  |  | 24.76 |
| 29 | 281.173 | 4.80 | 1.53172 | 48.8 | 0.5630 | 25.25 |
| 30 | −30.833 | 1.37 | 1.83400 | 37.2 | 0.5775 | 25.44 |
| 31 | −91.060 | 0.12 |  |  |  | 26.18 |
| 32 | 63.027 | 4.81 | 1.72047 | 34.7 | 0.5834 | 26.66 |
| 33 | −55.843 | 1.78 | 1.80518 | 25.4 | 0.6161 | 26.52 |
| 34 | −11707.793 | 31.11 |  |  |  | 26.37 |
| 35 | 45.769 | 4.81 | 1.49700 | 81.5 | 0.5375 | 26.82 |
| 36 | −87.359 | 0.12 |  |  |  | 26.57 |
| 37 | 357.305 | 1.37 | 1.88300 | 40.8 | 0.5667 | 26.06 |
| 38 | 29.004 | 5.19 | 1.49700 | 81.5 | 0.5375 | 25.14 |
| 39 | −134.470 | 0.28 |  |  |  | 25.06 |
| 40 | 64.530 | 5.27 | 1.49700 | 81.5 | 0.5375 | 24.73 |
| 41 | −33.681 | 1.37 | 1.88300 | 40.8 | 0.5667 | 24.30 |
| 42 | −158.115 | 0.12 |  |  |  | 24.22 |
| 43 | 157.207 | 2.49 | 1.80518 | 25.4 | 0.6161 | 24.03 |
| 44 | 9233.957 | 2.97 |  |  |  | 23.69 |
| 45 | ∞ | 37.48 | 1.60859 | 46.4 | 0.5664 | 29.73 |
| 46 | ∞ | 5.17 | 1.51633 | 64.2 | 0.5352 | 29.73 |
| 47 | ∞ | (Variable) |  |  |  | 29.73 |
| Image plane | ∞ |  |  |  |  |  |

Various data
Zoom ratio 8.00

|  | Wide-angle | Intermediate | Telephoto |
|---|---|---|---|
| Focal length | 10.70 | 30.29 | 85.62 |
| F number | 2.28 | 2.27 | 2.27 |
| Field angle | 27.20 | 10.29 | 3.68 |
| Image height | 5.50 | 5.50 | 5.50 |
| Total lens length | 285.47 | 285.47 | 285.47 |
| BF | 41.53 | 41.53 | 41.53 |
| d13 | 4.21 | 40.88 | 60.78 |
| d22 | 60.35 | 19.59 | 3.47 |
| d25 | 4.07 | 8.16 | 4.38 |
| d47 | 11.89 | 11.89 | 11.89 |
| Incident pupil position | 71.13 | 153.89 | 313.63 |
| Exit pupil position | −233.54 | −233.54 | −233.54 |

-continued (Numerical Embodiment 4)

| | | | |
|---|---|---|---|
| Front principal point position | 81.36 | 180.44 | 369.38 |
| Rear principal point position | 1.19 | −18.40 | −73.73 |

Zoom lens unit data

| Unit | Most-object-side surface | Focal length | Lens structure length | Front principal point position | Rear principal point position |
|---|---|---|---|---|---|
| 1 | 1 | 77.30 | 79.25 | 62.50 | 14.52 |
| 2 | 14 | −22.59 | 20.78 | 0.20 | −19.02 |
| 3 | 23 | −54.11 | 5.02 | −0.29 | −3.03 |
| 4 | 26 | 41.48 | 115.89 | 32.68 | −79.41 |

(Numerical Embodiment 5)

Surface data

| Surface number | r | d | nd | vd | θgF | Effective diameter |
|---|---|---|---|---|---|---|
| 1 | 348.182 | 3.86 | 1.77250 | 49.6 | 0.5521 | 78.53 |
| 2 | 65.248 | 6.25 | | | | 70.54 |
| 3 | 65.578 | 6.13 | 1.75520 | 27.5 | 0.6103 | 69.19 |
| 4 | 97.706 | 8.94 | | | | 67.70 |
| 5 | 612.487 | 5.45 | 1.49700 | 81.5 | 0.5375 | 65.53 |
| 6 | −416.776 | 20.81 | | | | 64.14 |
| 7 | 373.686 | 2.97 | 1.69895 | 30.1 | 0.6029 | 59.10 |
| 8 | 58.828 | 11.20 | 1.43875 | 95.0 | 0.5342 | 57.56 |
| 9 | −578.845 | 0.12 | | | | 57.57 |
| 10 | 113.463 | 6.31 | 1.43875 | 95.0 | 0.5342 | 57.41 |
| 11 | −693.179 | 0.12 | | | | 57.04 |
| 12 | 81.228 | 7.09 | 1.77250 | 49.6 | 0.5521 | 56.42 |
| 1 | −911.265 | (Variable) | | | | 55.84 |
| 14 | 47.769 | 1.19 | 1.77250 | 49.6 | 0.5521 | 23.96 |
| 15 | 19.993 | 5.13 | | | | 21.26 |
| 16 | −37.085 | 1.19 | 1.77250 | 49.6 | 0.5521 | 20.80 |
| 17 | 37.085 | 4.25 | | | | 20.22 |
| 18 | −44.595 | 3.54 | 1.72825 | 28.5 | 0.6077 | 20.54 |
| 19 | −24.436 | 1.19 | 1.77250 | 49.6 | 0.5521 | 21.25 |
| 20 | −72.930 | 0.12 | | | | 22.15 |
| 21 | 74.058 | 4.17 | 1.67270 | 32.1 | 0.5988 | 22.78 |
| 22 | −70.755 | (Variable) | | | | 22.94 |
| 23 | −35.850 | 1.07 | 1.77250 | 49.6 | 0.5521 | 19.03 |
| 24 | 56.162 | 3.95 | 1.84666 | 23.8 | 0.6205 | 20.13 |
| 25 | −516.532 | (Variable) | | | | 21.02 |
| 26 (Stop) | ∞ | 1.65 | | | | 23.29 |
| 27 | −112.419 | 2.64 | 1.64000 | 60.1 | 0.5372 | 24.12 |
| 28 | −41.910 | 0.12 | | | | 24.76 |
| 29 | 2388.431 | 4.30 | 1.58144 | 40.8 | 0.5775 | 25.25 |

-continued (Numerical Embodiment 5)

| | | | | | | |
|---|---|---|---|---|---|---|
| 30 | −30.493 | 1.37 | 1.90366 | 31.3 | 0.5947 | 25.44 |
| 31 | −71.086 | 0.56 | | | | 26.18 |
| 32 | 54.519 | 6.01 | 1.72047 | 34.7 | 0.5834 | 26.66 |
| 33 | −67.745 | 1.78 | 1.80518 | 25.4 | 0.6161 | 26.52 |
| 34 | 321.099 | (Variable) | | | | 26.37 |
| 35 | 32.697 | 6.90 | 1.49700 | 81.5 | 0.5375 | 26.82 |
| 36 | −173.413 | 2.00 | | | | 26.57 |
| 37 | 197.167 | 1.37 | 1.88300 | 40.8 | 0.5667 | 26.06 |
| 38 | 23.856 | 5.61 | 1.49700 | 81.5 | 0.5375 | 25.14 |
| 39 | −143.740 | 0.28 | | | | 25.06 |
| 40 | 75.774 | 5.23 | 1.49700 | 81.5 | 0.5375 | 24.73 |
| 41 | −29.046 | 1.37 | 1.88300 | 40.8 | 0.5667 | 24.30 |
| 42 | −185.352 | 0.12 | | | | 24.22 |
| 43 | 95.154 | 2.34 | 1.80518 | 25.4 | 0.6161 | 24.03 |
| 44 | −905.404 | 2.95 | | | | 23.69 |
| 45 | ∞ | 37.48 | 1.60859 | 46.4 | 0.5664 | 29.73 |
| 46 | ∞ | 5.17 | 1.51633 | 64.2 | 0.5352 | 29.73 |
| 47 | ∞ | (Variable) | | | | 29.73 |
| Image plane | ∞ | | | | | |

Various data
Zoom ratio 8.00

| | Wide-angle | Intermediate | Telephoto |
|---|---|---|---|
| Focal length | 10.70 | 30.29 | 85.62 |
| F number | 2.30 | 2.30 | 2.30 |
| Field angle | 27.20 | 10.29 | 3.68 |
| Image height | 5.50 | 5.50 | 5.50 |
| Total lens length | 289.97 | 289.97 | 289.97 |
| BF | 41.50 | 41.50 | 41.50 |
| d13 | 4.21 | 40.88 | 60.78 |
| d22 | 60.35 | 19.59 | 3.47 |
| d25 | 4.07 | 8.16 | 4.38 |
| d34 | 31.14 | 31.14 | 31.14 |
| d47 | 11.89 | 11.89 | 11.89 |
| Incident pupil position | 71.13 | 153.89 | 313.63 |
| Exit pupil position | −274.21 | −274.21 | −274.21 |
| Front principal point position | 81.43 | 180.97 | 373.63 |
| Rear principal point position | 1.19 | −18.40 | −73.73 |

Zoom lens unit data

| Unit | Most-object-side surface | Focal length | Lens structure length | Front principal point position | Rear principal point position |
|---|---|---|---|---|---|
| 1 | 1 | 77.30 | 79.25 | 62.50 | 14.52 |
| 2 | 14 | −22.59 | 20.78 | 0.20 | −19.02 |
| 3 | 23 | −54.11 | 5.02 | −0.29 | −3.03 |
| 4 | 26 | 46.01 | 18.43 | 5.48 | −6.28 |
| 5 | 35 | 59.97 | 70.81 | 3.95 | −43.72 |

(Numerical Embodiment 6)

Surface data

| Surface number | r | d | nd | vd | θgF | Effective diameter |
|---|---|---|---|---|---|---|
| 1* | 227.195 | 2.50 | 1.77250 | 49.6 | 0.5521 | 87.70 |
| 2 | 33.736 | 19.76 | | | | 61.84 |
| 3 | 311.589 | 1.85 | 1.75500 | 52.3 | 0.5476 | 61.28 |
| 4 | 80.391 | 13.54 | | | | 58.97 |
| 5 | −80.728 | 1.75 | 1.75500 | 52.3 | 0.5476 | 58.73 |
| 6 | −17642.010 | 1.30 | | | | 60.74 |
| 7 | 135.169 | 6.62 | 1.80518 | 25.4 | 0.6161 | 63.25 |
| 8 | −339.711 | 1.16 | | | | 63.31 |

-continued (Numerical Embodiment 6)

| | | | | | | |
|---|---|---|---|---|---|---|
| 9 | 328.904 | 9.40 | 1.51633 | 64.1 | 0.5352 | 62.99 |
| 10* | −74.094 | 11.86 | | | | 62.84 |
| 11 | 1211.778 | 8.57 | 1.48749 | 70.2 | 0.5300 | 54.63 |
| 12 | −67.682 | 1.65 | 1.88300 | 40.8 | 0.5667 | 54.19 |
| 13 | −126.215 | 0.20 | | | | 54.42 |
| 14 | 182.391 | 1.65 | 2.00330 | 28.3 | 0.5980 | 52.89 |
| 15 | 55.727 | 10.56 | 1.49700 | 81.5 | 0.5375 | 52.39 |
| 16 | −405.898 | 0.20 | | | | 53.25 |
| 17 | 130.732 | 9.01 | 1.49700 | 81.5 | 0.5375 | 54.61 |
| 18 | −91.216 | 0.20 | | | | 54.76 |
| 19 | 57.687 | 7.79 | 1.62041 | 60.3 | 0.5426 | 52.65 |
| 20 | 1234.500 | (Variable) | | | | 51.79 |
| 21 | 52.721 | 0.75 | 1.88300 | 40.8 | 0.5667 | 21.51 |
| 22 | 13.435 | 3.29 | | | | 18.24 |
| 23 | 67.192 | 0.75 | 1.88300 | 40.8 | 0.5667 | 18.10 |
| 24 | 36.490 | 2.83 | | | | 17.67 |
| 25 | −48.656 | 4.75 | 1.80518 | 25.4 | 0.6161 | 17.46 |
| 26 | −12.990 | 0.80 | 1.88300 | 40.8 | 0.5667 | 17.55 |
| 27 | −1003.160 | 0.20 | | | | 18.01 |
| 28 | 33.652 | 2.54 | 1.68893 | 31.1 | 0.6003 | 18.31 |
| 29 | 1299.417 | (Variable) | | | | 18.15 |
| 30 | −26.243 | 0.75 | 1.75500 | 52.3 | 0.5476 | 18.06 |
| 31 | 52.073 | 2.45 | 1.80810 | 22.8 | 0.6307 | 19.53 |
| 32 | −173.421 | (Variable) | | | | 20.04 |
| 33 (Stop) | ∞ | 1.40 | | | | 26.40 |
| 34 | −2121.299 | 3.15 | 1.51742 | 52.4 | 0.5564 | 27.32 |
| 35 | −49.227 | 0.20 | | | | 27.85 |
| 36 | 417.806 | 2.64 | 1.51742 | 52.4 | 0.5564 | 28.75 |
| 37 | −96.963 | 0.20 | | | | 29.02 |
| 38 | 80.890 | 6.59 | 1.54072 | 47.2 | 0.5650 | 29.47 |
| 39 | −34.094 | 1.20 | 1.92286 | 18.9 | 0.6495 | 29.42 |
| 40 | −84.780 | 1.50 | | | | 29.97 |
| 41 | 31.960 | 6.58 | 1.49700 | 81.5 | 0.5375 | 29.96 |
| 42 | −129.452 | 0.24 | | | | 29.27 |
| 43 | 38.837 | 5.28 | 1.49700 | 81.5 | 0.5375 | 26.96 |
| 44 | −102.023 | 1.50 | 1.90366 | 31.3 | 0.5947 | 25.55 |
| 45 | 401349.727 | 9.05 | | | | 24.48 |
| 46 | −46.307 | 3.07 | 1.92286 | 18.9 | 0.6495 | 16.55 |
| 47 | −23.607 | 1.50 | 1.77250 | 49.6 | 0.5521 | 15.93 |
| 48 | 19.071 | 5.28 | | | | 14.42 |
| 49 | 50.710 | 4.80 | 1.80810 | 22.8 | 0.6307 | 29.92 |
| 50 | −107.018 | 6.73 | | | | 29.50 |
| 51 | −121.364 | 1.20 | 1.88300 | 40.8 | 0.5667 | 23.81 |
| 52 | 21.943 | 5.75 | 1.48749 | 70.2 | 0.5300 | 22.38 |
| 53 | −90.948 | 0.24 | | | | 22.24 |
| 54 | 63.655 | 6.27 | 1.49700 | 81.5 | 0.5375 | 21.83 |
| 55 | −19.511 | 1.20 | 2.00330 | 28.3 | 0.5980 | 21.66 |
| 56 | −95.121 | 0.15 | | | | 22.70 |
| 57 | 150.628 | 5.28 | 1.49700 | 81.5 | 0.5375 | 23.08 |
| 58 | −25.533 | 4.00 | | | | 23.38 |
| 59 | ∞ | 33.00 | 1.60859 | 46.4 | 0.5664 | 40.00 |
| 60 | ∞ | 13.20 | 1.51680 | 64.2 | 0.5347 | 40.00 |
| 61 | ∞ | (Variable) | | | | 40.00 |
| Image plane | ∞ | | | | | |

Aspherical surface data

First surface

K = −5.42173e+001   A4 = 1.90661e−006   A6 = 3.73103e−011   A8 = −1.91524e−013
A10 = −6.77526e−019
A3 = −4.12872e−006   A5 = −1.32181e−008   A7 = 2.42261e−012   A9 = 2.44378e−015

Tenth surface

K = −2.28238e+000   A4 = −2.08837e−007   A6 = 2.96604e−011   A8 = 3.48782e−013
A10 = −1.18721e−016
A3 = −6.36724e−007   A5 = 5.61037e−010   A7 = −1.11164e−011   A9 = −3.18271e−016

Various data
Zoom ratio 13.00

| | Wide-angle | Intermediate | Telephoto |
|---|---|---|---|
| Focal length | 8.90 | 32.04 | 115.70 |
| F number | 3.80 | 3.81 | 5.60 |

-continued

| (Numerical Embodiment 6) | | | |
|---|---|---|---|
| Field angle | 31.72 | 9.74 | 2.72 |
| Image height | 5.50 | 5.50 | 5.50 |
| Total lens length | 300.02 | 300.02 | 300.02 |
| BF | 38.14 | 38.14 | 38.14 |
| d20 | 0.91 | 31.10 | 44.72 |
| d29 | 42.27 | 8.63 | 6.22 |
| d32 | 9.00 | 12.46 | 1.24 |
| d61 | 4.97 | 4.97 | 4.97 |
| Incident pupil position | 34.85 | 53.95 | 97.66 |
| Exit pupil position | −121.15 | −121.15 | −121.15 |
| Front principal point position | 43.12 | 77.85 | 107.22 |
| Rear principal point position | −3.93 | −27.07 | −110.73 |

| Zoom lens unit data | | | | |
|---|---|---|---|---|
| Unit | Most-object-side surface | Focal length | Lens structure length | Front principal point position | Rear principal point position |
| 1 | 1 | 26.80 | 109.58 | 47.04 | 36.95 |
| 2 | 21 | −16.80 | 15.91 | 0.43 | −11.92 |
| 3 | 30 | −43.80 | 3.20 | −0.39 | −2.18 |
| 4 | 33 | 33.34 | 131.21 | 7.71 | −111.12 |

Correspondence between each embodiment and the above-mentioned conditional expression is illustrated in Table 1.

TABLE 1

| Conditional expression | Embodiment | | | | | |
|---|---|---|---|---|---|---|
| | 1 | 2 | 3 | 4 | 5 | 6 |
| (1) | 0.402 | 0.550 | 0.626 | 0.623 | 0.623 | 0.526 |
| (9) | 3.65E−03 | 2.50E−03 | 2.47E−03 | 2.15E−03 | 2.34E−03 | 2.84E−03 |
| (10) | 0.90 | 0.95 | 0.92 | 0.22 | 0.43 | 1.02 |
| (11) | −1.323E−04 | −1.325E−03 | −1.325E−03 | −1.412E−03 | −1.412E−03 | −9.359E−04 |
| (12) | 18.9 | 23.8 | 23.8 | 25.4 | 25.4 | 22.8 |
| (13) | 0.407 | 0.407 | 0.407 | 0.436 | 0.409 | 0.407 |
| (14) | −0.19° | 0.04° | 0.14° | 2.45° | 1.22° | 0.45° |
| (15) | 1.116 | 1.247 | 1.260 | 0.211 | 0.403 | 1.212 |
| (16) | 1.120 | 1.199 | 1.156 | 0.321 | 0.565 | 1.274 |
| (17) | 1.238 | 1.612 | 1.451 | 0.274 | 0.537 | 1.795 |
| (18) | −0.740 | −1.189 | −0.945 | −0.315 | −0.602 | −1.445 |
| (19) | 0.798 | 0.905 | 0.853 | 0.316 | 0.504 | 0.885 |
| (20) | −0.478 | −0.546 | −0.512 | −0.209 | −0.324 | −0.527 |

According to the above-mentioned embodiments of the present invention, there is provided a zoom lens system which has high optical performance over the entire zoom range and an image pickup apparatus including the same.

While the present invention has been described with reference to embodiments, it is to be understood that the invention is not limited to the disclosed embodiments. The scope of the following claims is to be accorded the broadest interpretation so as to encompass all such modifications and equivalent structures and functions. While the present invention has been described with reference to embodiments, it is to be understood that the invention is not limited to the disclosed embodiments.

This application claims the benefit of Japanese Patent Application No. 2009-066507, filed on Mar. 18, 2009, which is hereby incorporated by reference herein in its entirety.

What is claimed is:

1. A zoom lens system comprising, in order from an object side to an image side:

a first lens unit having a positive refractive power;
a second lens unit having a negative refractive power;
a third lens unit having a negative refractive power;
an aperture stop; and
a fourth lens unit having a positive refractive power,
wherein the fourth lens unit includes, in order from the object side, a front lens subunit having a positive refractive power and a rear lens subunit having a positive refractive power with a largest air interval in the fourth lens unit therebetween, wherein
the following expression is satisfied, $$0.400 < \nu m / (\nu rp - \nu rn) < 0.630,$$

where $\nu m$ represents the Abbe number of the material of a first positive lens having the largest dispersion of the positive lenses included in the rear lens subunit, $\nu rp$ represents the average Abbe number of materials of positive lenses other than the first positive lens in the rear lens subunit, and $\nu rn$ represents the average Abbe number of materials of negative lenses in the rear lens subunit.

2. The zoom lens system according to claim 1, wherein the following expression is satisfied, $$2.1 \times 10^{-3} < (\theta fn - \theta fp)/(\nu fp - \nu fn) < 3.7 \times 10^{-3},$$

where $\nu fp$ and $\theta fp$ represent the average Abbe number and the average partial dispersion ratio of the materials of the positive lenses in the front lens subunit, respectively, and $\nu fn$ and $\theta fn$ represent the average Abbe number and the average partial dispersion ratio of the materials of the negative lenses in the front lens subunit, respectively.

3. The zoom lens system according to claim 1, wherein the following expression is satisfied, $$0.2 < \phi m/\phi f < 1.1,$$

where $\phi f$ represents the refractive power of the front lens subunit, and $\phi m$ represents a refractive power of the first positive lens.

4. The zoom lens system according to claim 1, wherein the following conditions are satisfied:

$$-1.65 \times 10^{-3} < (\theta m - 0.652)/\nu m < 0; \text{ and}$$

$$15 < \nu m < 30,$$

where $\theta m$ represents the partial dispersion ratio of the first positive lens.

5. The zoom lens system according to claim 1, wherein the first positive lens comprises a single lens.

6. The zoom lens system according to claim 1, wherein the front lens subunit includes at least one positive lens and a cemented lens configured by joining a positive lens and a negative lens.

7. An image pickup apparatus comprising:
an image pickup element; and
a zoom lens system for forming an image of a subject on the image pickup element,
wherein the zoom lens system comprises, in order from an object side to an image side:
a first lens unit having a positive refractive power;
a second lens unit having a negative refractive power;
a third lens unit having a negative refractive power;
an aperture stop; and
a fourth lens unit having a positive refractive power,
wherein the fourth lens unit includes, in order from the object side, a front lens subunit having a positive refractive power and a rear lens subunit having a positive refractive power with a largest air interval in the fourth lens unit therebetween, wherein
the following expression is satisfied, $$0.400 < \nu m/(\nu rp - \nu rn) < 0.630,$$

where $\nu m$ represents the Abbe number of the material of a first positive lens having the largest dispersion of the positive lenses included in the rear lens subunit, $\nu rp$ represents the average Abbe number of materials of positive lenses other than the first positive lens in the rear lens subunit, and $\nu rn$ represents the average Abbe number of materials of negative lenses in the rear lens subunit.

* * * * *